United States Patent
Kumar et al.

(10) Patent No.: US 9,922,328 B2
(45) Date of Patent: Mar. 20, 2018

(54) ACCELERATION OF SYSTEM DOCUMENTATION CONFORMANCE TO DIFFERENTIATED REGULATIONS OF MULTIPLE COUNTRIES

(71) Applicant: ORACLE INTERNATIONAL CORPORATION, Redwood Shores, CA (US)

(72) Inventors: Ashish Kumar, Belmont, CA (US); Carolyn Luk, Hillsborough, CA (US); David Haimes, Belmont, CA (US); Rama Raja Sekhar Allamsette, Hyderabad-Telangana (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 340 days.

(21) Appl. No.: 14/598,011

(22) Filed: Jan. 15, 2015

(65) Prior Publication Data
US 2016/0210637 A1  Jul. 21, 2016

(51) Int. Cl.
*G07B 17/00* (2006.01)
*G07F 19/00* (2006.01)
(Continued)

(52) U.S. Cl.
CPC .......... *G06Q 30/018* (2013.01); *G06Q 40/12* (2013.12); *G06F 17/30* (2013.01); *G06Q 10/00* (2013.01);
(Continued)

(58) Field of Classification Search
CPC ........ G06Q 10/00; G06Q 30/00; G06Q 40/00; G06Q 30/04; G06F 17/30
(Continued)

(56) References Cited

U.S. PATENT DOCUMENTS 8,156,150 B2 * 4/2012 Ng ................ G06F 17/30592
707/791
8,315,900 B2 * 11/2012 Schwarz ............ G06Q 10/0631
705/7.12
(Continued)

FOREIGN PATENT DOCUMENTS

CA        2 260 481 A1    7/1999

OTHER PUBLICATIONS

ARIS software announces availability of NoetixViews for oracle HRMS applications. (May 15, 1998). PR Newswire Retrieved from http://dialog.proquest.com/professional/docview/666407779?accountid=142257.*

(Continued)

*Primary Examiner* — Olusegun Goyea
(74) *Attorney, Agent, or Firm* — Kilpatrick Townsend & Stockton LLP

(57) ABSTRACT

Systems, methods, and computer-readable media for acceleration of system documentation conformance to differentiated regulations of multiple countries are provided. A database may be prepopulated with documentation specifications specifying documentation attributes corresponding to transaction types and countries. Information indicative of an enterprise structure may be processed. Countries that correspond to the enterprise structure may be identified. Country-specific rules may be determined, the rules defining requirements pertaining to documentation of transactions. A first subset of documentation attributes may be selected based on the rules, the first subset specifying documentation options pertaining to a first transaction type. A second subset of documentation attributes may be selected based on the rules, the second subset specifying documentation options pertaining to a second transaction type. A set of objects to facilitate setup of an accounting program may be generated.

(Continued)

The computer system may be configured to execute the accounting program based on the set of objects.

20 Claims, 19 Drawing Sheets

(51) Int. Cl.
| | | |
|---|---|---|
| *G06Q 40/00* | (2012.01) | |
| *G06Q 30/00* | (2012.01) | |
| *G06Q 10/00* | (2012.01) | |
| *G06Q 30/04* | (2012.01) | |
| *G06F 17/30* | (2006.01) | |

(52) U.S. Cl.
CPC ............ *G06Q 30/00* (2013.01); *G06Q 30/04* (2013.01); *G06Q 40/00* (2013.01)

(58) Field of Classification Search
USPC ..... 705/30, 31, 36 R, 37, 64, 7.12; 707/791, 707/999.205
See application file for complete search history.

(56) References Cited

U.S. PATENT DOCUMENTS

| | | | |
|---|---|---|---|
| 2002/0087454 A1* | 7/2002 | Calo | G06O 30/06 705/37 |
| 2002/0087455 A1* | 7/2002 | Tsagarakis | G06Q 20/382 705/37 |
| 2006/0041605 A1* | 2/2006 | King | G06F 17/30011 |
| 2008/0120129 A1 | 5/2008 | Seubert et al. | |
| 2009/0112743 A1* | 4/2009 | Mullins | G06Q 30/04 705/31 |
| 2009/0112773 A1* | 4/2009 | Song | G06Q 40/04 705/36 R |

OTHER PUBLICATIONS

Noetix introduces NoetixViews 6.2 for oracle E-business suite. (Oct. 18, 2012). Business Wire Retrieved from http://dialog.proquest.com/professional/docview/1113241540?accountid=142257.*
Computron (2014). "Computron Sub-Ledger, A Functional Overview," retrieved from <http://www.computronsoftware.com/wp-content/uploads/2014/12/subledger_a-functional-overview.pdf>, 12 pages.
Wallstreet Systems (2007). "Wallstreet Suite, Fact Sheet: Accounting," retrieved from <http://www.wallstreetsystems.com/documents/wallstreetsuite_accounting_fact_sheet.pdf>, 4 pages.
Senova (2014). "Any Acount—Avoid accounting horror stories! Switch to Any Account," retrieved from <http://senova.lk/accounting-package-accounting.html>, last visited on Jul. 15, 2014, 2 pages.
"Running Automated Accounting," (Date unknown), retrieved from <http://ascensionstcs.adayana.net/courses/Symphony%20UPK/Finance/Treasury_and_Cash_Management/Treasury_and_Cash_Management_System_and_Process/PlayerPackage/html/tpc/a70d7197-9aa5-4bd3-8eb5-7288be5a598d/topic.html>, last visited on Jul. 15, 2014, 3 pages.
Nelson, K. (Jun. 2014). "Planning your chart of accounts in AX 2012 (Part 2 of 7)," retrieved from <http://blogs.msdn.com/b/axsa/archive/2014/06/23/planning-your-chart-of-accounts-in-ax-2012-part-2-of-7.aspx>, last visited on Jul. 15, 2014, 4 pages.
Kuali Foundation (May 2010). "The Kuali Financial System: Community-Developed Software for Education," retrieved from <http://www.kuali.org/sites/default/files/old/KFS%20-%20Community%20Developed%20Software%20for%20Education.pdf>, 94 pages.
P2 Energy Solutions Wiki (last modified Apr. 21, 2014), "Chart of Accounts," retrieved from <http://documenthub.p2es.com/fm/index.php/Chart_of_Accounts_Page_Link>, last visited on Jul. 15, 2014, 7 pages.
Kalway, M. et al. (Aug. 2013). "Oracle Cloud Setting Up Financials: Quick Start," Release 13.1, Part No. E38515.01, 94 pages.
Wohnoutka, K. et al. (Mar. 2013). "Oracle Fusion Accounting Hub Implementation Guide," 11g Release 7 (11.1.7), Part No. E20374-07, 386 pages.
Oracle Applications (Nov. 27, 2011). "Designing Your Accounting Flexfield," retrieved from <http://docs.oracle.com/cd/A60725_05/html/comnls/us/gl/acctgff.htm>, 2 pages.
Woodhull, S. et al. (Jun. 2010). "Oracle E-Business Suite Flexfields Guide," Release 12.1, Part No. E12892-04, 348 pages.

* cited by examiner

600-1

Legal Entities

| Name | Country |
|---|---|
| IFU InFusion USA Ltd._92_3 | United States |
| IFF InFusion Farms Ltd._92_3 | India |
| VSCC InFusion San Carlos Chocolates_92_3 | France |
| VSC InFusion Stockton Citrus_92_3 | Italy |
| VCC InFusion Cupertino Cherries_92_3 | China |
| VFPM InFusion Production Mfg Ltd._92_3 | United Kingdom |
| Infusion Core Canada Ltd._92_3 | Canada |

Accounting Calendar

| Name | Start Date | Period Frequency |
|---|---|---|
| r92bcp_92_3 | 1-Nov-2009 | Monthly |

Ledgers

| Name | Country |
|---|---|
| r92bcp_92_3 US | United States |
| r92bcp_92_3 IN | India |
| r92bcp_92_3 FR | France |
| r92bcp_92_3 IT | Italy |
| r92bcp_92_3 CN | China |
| r92bcp_92_3 GB | United Kingdom |
| r92bcp_92_3 CA | Canada |

*FIG. 6B*

Default Document Sequence Categories
750 — 752

| Transaction | Code | Name |
|---|---|---|
| Payables Invoice | CRM INV | Credit Memo Invoices |
|  | DBM INV | Debit Memo Invoices |
|  | INT INV | Interest Invoices |
|  | PAY REQ INV | Payment Request |
|  | PREPAY INV | Prepayment Invoices |
|  | STD INV | Standard Invoices |
| Payments | CHECK PAY | Check Payments |
|  | CLEAR PAY | Clearing Payments |
|  | EFT PAY | Electronic Payments |
|  | WIRE PAY | Wire Payments |
| Receivables Invoices | Invoice | Invoice |
|  | PA Invoice | PA Invoice |
|  | PA Internal Invoice | PA Internal Invoice |
|  | Intercompany | Intercompany |
| Receivables Credit Memos | Credit Memo | Credit Memo |
|  | PA Credit Memo | PA Credit Memo |
| Receivables Adjustment Activities | Adjustment Reversal | Adjustment Reversal |
|  | Chargeback Reversal | Chargeback Reversal |
|  | Chargeback Adjustment | Chargeback Adjustment |

*FIG. 7B*

```
800-1
  ┌─────────────────────────────────────────────────────────────────────┐
  │ [O]                        902                    974          [?][X]│
  │     658-1                   ↙                      ↙                 │
  │ -------------------------------------------------------------------- │
  │ Parameters passed to createDocSequences method are: Transaction = AP_INVOICES restart=MONTHLY
  │ initial value= 12 Calendar=r92bcp_92_3
  │ Start: createDocSequences(), Transaction: AP_INVOICES, Restart Frequency: MONTHLY, Initial
  │ Value: 12, Calendar: r92bcp_92_3
  │ Start: createDocSequenceVersions(), Transaction: AP_INVOICES, Number of Versions: 24, Initial
  │ Value: 12, Ledger: r92bcp_92_3 US ◄── 904-1
  │ Skipped: No Sequences should be generated for this country: US
  │ Start: createDocSequenceVersions(), Transaction: AP_INVOICES, Number of Versions: 24, Initial
  │ Value: 12, Ledger: r92bcp_92_3 IN ◄── 904-2              908
  │ Created Document Sequence: 2010-01-233F ◄── 906-1
  │ Assigned Document Sequence: 2010-01-233F to Category: CRM INV
  │ Assigned Document Sequence: 2010-01-233F to Category: DBM INV
  │ Assigned Document Sequence: 2010-01-233F to Category: INT INV
  │ Assigned Document Sequence: 2010-01-233F to Category: PAY REQ INV
  │ Assigned Document Sequence: 2010-01-233F to Category: PREPAY INV
  │ Assigned Document Sequence: 2010-01-233F to Category: STD INV
  │ Created Document Sequence: 2010-02-2340 ◄── 906-2
  │ Assigned Document Sequence: 2010-02-2340 to Category: CRM INV
  │ Assigned Document Sequence: 2010-02-2340 to Category: DBM INV
  │ Assigned Document Sequence: 2010-02-2340 to Category: INT INV
  │ Assigned Document Sequence: 2010-02-2340 to Category: PAY REQ INV
  │ Assigned Document Sequence: 2010-02-2340 to Category: PREPAY INV
  │ Assigned Document Sequence: 2010-02-2340 to Category: STD INV
  │ . . . . .
  │ . . . . .
  │ Created Document Sequence: 2011-11-2355 ◄── 906-3
  │ Assigned Document Sequence: 2011-11-2355 to Category: CRM INV
  │ Assigned Document Sequence: 2011-11-2355 to Category: DBM INV
  │ Assigned Document Sequence: 2011-11-2355 to Category: INT INV
  │ Assigned Document Sequence: 2011-11-2355 to Category: PAY REQ INV
  │ Assigned Document Sequence: 2011-11-2355 to Category: PREPAY INV
  │ Assigned Document Sequence: 2011-11-2355 to Category: STD INV
  │ Created Document Sequence: 2011-12-2356 ◄── 906-4
  │ Assigned Document Sequence: 2011-12-2356 to Category: CRM INV
  │ Assigned Document Sequence: 2011-12-2356 to Category: DBM INV
  │ Assigned Document Sequence: 2011-12-2356 to Category: INT INV
  │ Assigned Document Sequence: 2011-12-2356 to Category: PAY REQ INV
  │ Assigned Document Sequence: 2011-12-2356 to Category: PREPAY INV
  │ Assigned Document Sequence: 2011-12-2356 to Category: STD INV
  │ End: createDocSequenceVersions()
  │ . . . . .
  │ . . . . .
  │ Start: createDocSequenceVersions(), Transaction: AP_PAYMENTS, Number of Versions: 2, Initial
  │ Value: 12, Ledger: r92bcp_92_3 GB ◄── 904-3
  │ Skipped: No Sequences should be generated for this country: GB
  │ Start: createDocSequenceVersions(), Transaction: AP_PAYMENTS, Number of Versions: 2, Initial
  │ Value: 12, Ledger: r92bcp_92_3 CA ◄── 904-4
  │ Skipped: No Sequences should be generated for this country: CA
  │ End: createDocSequences()
  │
  │ Processing succeeded for the transaction: AP_PAYMENTS
  │ --------------------------------------------------------------------
  └─────────────────────────────────────────────────────────────────────┘
```

*FIG. 9A*

```
800-2
┌─────────────────────────────────────────────────────────────────────┐
│ ⊙                          952                              975  ? ✕│
│             658-1           ↓                                ↓   ▲  │
│        ─────↓─────────────────────────────────────────────────────  │
│        Parameters passed to createDocSequences method are: Transaction = AP_PAYMENTS restart=ANNUALLY│
│        initial value= 12 Calendar=r92bcp_92_3                       │
│        Start: createDocSequences(), Transaction: AP_PAYMENTS, Restart Frequency: ANNUALLY, Initial│
│        Value: 12, Calendar: r92bcp_92_3                             │
│        Start: createDocSequenceVersions(), Transaction: AP_PAYMENTS, Number of Versions: 2, Initial│
│        Value: 12, Ledger: r92bcp_92_3 US ← 904-1                    │
│        Skipped: No Sequences should be generated for this country: US│
│        Start: createDocSequenceVersions(), Transaction: AP_PAYMENTS, Number of Versions: 2, Initial│
│        Value: 12, Ledger: r92bcp_92_3 IN ← 904-2    908-1           │
│        Created Document Sequence: 2010-00-239F                      │
│        Assigned Document Sequence: 2010-00-239F to Category: CHECK PAY│
│        Assigned Document Sequence: 2010-00-239F to Category: CLEAR PAY│
│        Assigned Document Sequence: 2010-00-239F to Category: EFT PAY│
│        Assigned Document Sequence: 2010-00-239F to Category: WIRE PAY│
│        Created Document Sequence: 2011-00-23A0                      │
│        Assigned Document Sequence: 2011-00-23A0 to Category: CHECK PAY│
│        Assigned Document Sequence: 2011-00-23A0 to Category: CLEAR PAY│
│        Assigned Document Sequence: 2011-00-23A0 to Category: EFT PAY│
│        Assigned Document Sequence: 2011-00-23A0 to Category: WIRE PAY│
│        End: createDocSequenceVersions()                             │
│        Start: createDocSequenceVersions(), Transaction: AP_PAYMENTS, Number of Versions: 2, Initial│
│        Value: 12, Ledger: r92bcp_92_3 FR                            │
│        Created Document Sequence: 2010-00-23A1                      │
│        Assigned Document Sequence: 2010-00-23A1 to Category: CHECK PAY│
│        Assigned Document Sequence: 2010-00-23A1 to Category: CLEAR PAY│
│        Assigned Document Sequence: 2010-00-23A1 to Category: EFT PAY│
│        Assigned Document Sequence: 2010-00-23A1 to Category: WIRE PAY│
│        Created Document Sequence: 2011-00-23A2                      │
│        Assigned Document Sequence: 2011-00-23A2 to Category: CHECK PAY│
│        Assigned Document Sequence: 2011-00-23A2 to Category: CLEAR PAY│
│        Assigned Document Sequence: 2011-00-23A2 to Category: EFT PAY│
│        Assigned Document Sequence: 2011-00-23A2 to Category: WIRE PAY│
│        End: createDocSequenceVersions()                             │
│        . . .                                                        │
│        End: createDocSequenceVersions()                             │
│        Start: createDocSequenceVersions(), Transaction: AP_PAYMENTS, Number of Versions: 2, Initial│
│        Value: 12, Ledger: r92bcp_92_3 GB                            │
│        Skipped: No Sequences should be generated for this country: GB│
│        Start: createDocSequenceVersions(), Transaction: AP_PAYMENTS, Number of Versions: 2, Initial│
│        Value: 12, Ledger: r92bcp_92_3 CA                            │
│        Skipped: No Sequences should be generated for this country: CA│
│        End: createDocSequences()                                    │
│                                                                  ▼  │
└─────────────────────────────────────────────────────────────────────┘
```

```
┌─────────────────────────────────────────────────────────────────────┐
│ [O]              1202           1274                         [?][X] │
│                   ↓              ↓                              [▲] │
│ -------------------------------------------------------------       │
│ Financials Sequences: Processing Journal Sequences                  │
│ -------------------------------------------------------------       │
│ Storing versions for Subledger Journals.                            │
│ Storing versions for General Ledger Journals.                       │
│ -------------------------------------------------------------       │
│ Processing for country: India                                       │
│ Sequence Country Default Code: General                              │
│ Generate Sequence for Country: Y                                    │
│ Determinant Type: LEDGER                                            │
│ Sequence Type: G                                                    │
│ Generate Reporting Accounting: N                              1275  │
│ Enforce Sequence Date Correlation Code: N                       ↙   │
│ Ledger Name: r92bcp_92_3 IN                                         │
│ Generating data for sequence: r92bcp_92_3 IN Accounting Sequence-SLA│
│ Generating data for sequence: r92bcp_92_3 IN Accounting Sequence-GL │
│ -------------------------------------------------------------       │
│ Processing for country: France                              ↖1276   │
│ Sequence Country Default Code: FR                                   │
│ Generate Sequence for Country: Y                                    │
│ Determinant Type: LE                                                │
│ Sequence Type: G                                                    │
│ Generate Reporting Accounting: Y                                    │
│ Enforce Sequence Date Correlation Code: N                           │
│ Ledger Name: r92bcp_92_3 FR                                         │
│ Legal Entity Name: VSCC InFusion San Carlos Chocolates_92_3         │
│ Legal Entity Identifier: US106111_92_3                              │
│ Generating data for sequence: VSCC InFusion San Carlos Chocolates_92_3 Accounting Sequence-SLA │
│ Generating data for sequence: VSCC InFusion San Carlos Chocolates_92_3 Accounting Sequence-GL │
│ Generating data for sequence: VSCC InFusion San Carlos Chocolates_92_3 Reporting Sequence-SLA │
│ Generating data for sequence: VSCC InFusion San Carlos Chocolates_92_3 Reporting Sequence-GL │
│ -------------------------------------------------------------       │
│ Processing for country: Italy                                       │
│ Sequence Country Default Code: IT                                   │
│ Generate Sequence for Country: Y                                    │
│ Determinant Type: LE                                                │
│ Sequence Type: G                                                    │
│ Generate Reporting Accounting: Y                                    │
│ Enforce Sequence Date Correlation Code: Y                           │
│ Ledger Name: r92bcp_92_3 IT                                         │
│ Legal Entity Name: VSC InFusion Stockton Citrus_92_3                │
│ Legal Entity Identifier: US107111_92_3                       1278   │
│ Generating data for sequence: VSC InFusion Stockton Citrus_92_3 Accounting Sequence-SLA ↙ │
│ Generating data for sequence: VSC InFusion Stockton Citrus_92_3 Accounting Sequence-GL │
│ Generating data for sequence: VSC InFusion Stockton Citrus_92_3 Reporting Sequence-SLA │
│ Generating data for sequence: VSC InFusion Stockton Citrus_92_3 Reporting Sequence-GL │
│ -------------------------------------------------------------       │
│ Processing for country: China                                 ↖1279 │
│ Sequence Country Default Code: General                              │
│ Generate Sequence for Country: Y                                    │
│ Determinant Type: LEDGER                                            │
│ Sequence Type: G                                                    │
│ Generate Reporting Accounting: N                                    │
│ Enforce Sequence Date Correlation Code: N                           │
│ Ledger Name: r92bcp_92_3 CN                                         │
│ Generating data for sequence: r92bcp_92_3 CN Accounting Sequence-SLA│
│ Generating data for sequence: r92bcp_92_3 CN Accounting Sequence-GL │
│ -------------------------------------------------------------  [▼]  │
└─────────────────────────────────────────────────────────────────────┘
```

*FIG. 12*

ACCELERATION OF SYSTEM DOCUMENTATION CONFORMANCE TO DIFFERENTIATED REGULATIONS OF MULTIPLE COUNTRIES

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Certain embodiments of the present disclosure relate generally to setup and configuration of system documentation, and in particular to systems, methods, and computer-readable media for acceleration of system documentation conformance to differentiated regulations of multiple countries.

Modern enterprise software may include accounting applications to help monitor an organization's finances. The accounting applications may manage transactions and finances for the entire organization, or departments or subsidiaries within the organization. Accounting applications may also be used to manage complex accounting, inventory management, balance sheet and financial report generation, and any other financial details of the business. For large businesses, Enterprise Resource Planning software may be used, and may include functional modules such as accounts payable, accounts receivable, payroll, and trial balance.

An organization may include or otherwise be associated with multiple legal entities and may have operations related to multiple countries. There are various regulations in place for various governments. For example, Italy may have one set of rules; the U.S. may have another set of rules; etc. Such rules may pertain to the sequences that need to be generated for each of these transactions. With respect to Europe, for example, document and accounting sequencing of transactional records are regulatory requirements for several countries including Italy, Spain, France, Germany, and Netherlands, among others. Such requirements may be intended to ensure an audit trail is available for all invoices, journals, and other transaction documents. Assigning sequencing rules at the required legal entity or ledger level may help to provide assurances to reviewers and auditors regarding the integrity and completeness of an organization's financial records. Thus, an organization operating across perhaps dozens of countries may need to comply with myriad country-specific regulations.

Enormous technical challenges are created by the difficulty of keeping track of all of the accounting information for organizations spanning multiple countries, which difficulty is further compounded by the fact that different information is treated differently in different countries. Traditionally, subject matter experts with expertise in each country are needed based on these differences. Yet, such subject matter experts often do not know each other's business practices. Therefore, there is a need in the art for improvements that address such technical challenges and deficiencies. This and others needs are addressed by the present disclosure.

BRIEF SUMMARY

Certain embodiments of the present disclosure relate generally to setup and configuration of system documentation, and in particular to systems, methods, and computer-readable media for acceleration of system documentation conformance to differentiated regulations of multiple countries.

In one aspect, a method of accelerating system documentation conformance to differentiated regulations of multiple countries is disclosed. The method may include one or a combination of the following, which may be performed by a computer system. One or more tables in a relational database system may be prepopulated with documentation specifications specifying documentation attributes corresponding to a plurality of transaction types and a plurality of countries. Information indicative of an enterprise structure may be processed. The information may indicate at least a first set of attributes corresponding to a set of one or more legal entities and a second set of attributes corresponding to a set of one or more ledgers. Based at least in part on the information indicative of the enterprise structure, one or more countries of the plurality of countries that correspond to the enterprise structure may be identified. Country-specific rules corresponding to the one or more countries may be determined. The country-specific rules may define requirements pertaining to documentation of transactions. A first subset of documentation attributes of the document attributes may be selected based at least in part on the country-specific rules, the first subset of documentation attributes specifying documentation options pertaining to at least a first transaction type. A second subset of documentation attributes of the document attributes may be selected based at least in part on the country-specific rules, the second subset of documentation attributes specifying documentation options pertaining to at least a second transaction type of the plurality of transaction types. Based at least in part on the first subset of documentation attributes, the second subset of documentation attributes, and the information indicative of the enterprise structure, a set of objects to facilitate setup of an accounting program may be generated. The set of objects may include a first subset of one or more objects corresponding to the set of one or more legal entities, a second subset of one or more objects corresponding to the set of one or more ledgers, and a third subset of one or more objects corresponding to an accounting calendar. The set of objects may be stored in association with the accounting program, enabling the accounting program to: generate a first series of transaction records of the first transaction type so that each transaction of the first series of transactions is associated with the first subset of documentation attributes; and generate a second series of transaction records of the second transaction type so that each transaction of the second series of transactions is associated with the second subset of documentation attributes.

In another aspect, one or more non-transitory, machine-readable media having machine-readable instructions thereon accelerating system documentation conformance to differentiated regulations of multiple countries are disclosed. The instructions, when executed by one or more processing devices, may cause the one or more processing devices to perform one or a combination of the following. One or more tables in a relational database system may be prepopulated with documentation specifications specifying documentation attributes corresponding to a plurality of transaction types and a plurality of countries. Information indicative of an enterprise structure may be processed. The information may indicate at least a first set of attributes corresponding to a set of one or more legal entities and a second set of attributes corresponding to a set of one or more ledgers. Based at least in part on the information indicative of the enterprise structure, one or more countries of the plurality of countries that correspond to the enterprise structure may be identified. Country-specific rules corresponding to the one or more countries may be determined. The country-specific rules may define requirements pertaining to documentation of transactions. A first subset of documentation attributes of the document attributes may be selected based at least in part on the country-specific rules, the first subset of documentation attributes specifying documentation options pertaining to at least a first transaction type. A second subset of documentation attributes of the document attributes may be selected based at least in part on the country-specific rules, the second subset of documentation attributes specifying documentation options pertaining to at least a second transaction type of the plurality of transaction types. Based at least in part on the first subset of documentation attributes, the second subset of documentation attributes, and the information indicative of the enterprise structure, a set of objects to facilitate setup of an accounting program may be generated. The set of objects may include a first subset of one or more objects corresponding to the set of one or more legal entities, a second subset of one or more objects corresponding to the set of one or more ledgers, and a third subset of one or more objects corresponding to an accounting calendar. The set of objects may be stored in association with the accounting program, enabling the accounting program to: generate a first series of transaction records of the first transaction type so that each transaction of the first series of transactions is associated with the first subset of documentation attributes; and generate a second series of transaction records of the second transaction type so that each transaction of the second series of transactions is associated with the second subset of documentation attributes.

In yet another aspect, one or more non-transitory, machine-readable media having machine-readable instructions thereon accelerating system documentation conformance to differentiated regulations of multiple countries are disclosed. The instructions, when executed by one or more processing devices, may cause the one or more processing devices to perform one or a combination of the following. Information indicative of an enterprise structure may be processed. The information may indicate at least a first set of attributes corresponding to a set of one or more legal entities and a second set of attributes corresponding to a set of one or more ledgers. Based at least in part on the information indicative of the enterprise structure, one or more countries of the plurality of countries that correspond to the enterprise structure may be identified. Country-specific rules corresponding to the one or more countries may be determined. The country-specific rules may define requirements pertaining to documentation of transactions. A first subset of documentation attributes of the document attributes may be selected based at least in part on the country-specific rules. The documentation attributes may correspond to a plurality of transaction types and a plurality of countries and may be specified by documentation specifications stored in one or more prepopulated tables in a relational database system. The first subset of documentation attributes may specify one or more documentation options pertaining to at least a first transaction type of the plurality of transaction types. A second subset of documentation attributes of the document attributes may be selected based at least in part on the country-specific rules, the second subset of documentation attributes specifying documentation options pertaining to at least a second transaction type of the plurality of transaction types. An accounting program may be initialized based at least in part on a set of objects stored in association with the accounting program. The set of objects may include a first subset of one or more objects corresponding to the set of one or more legal entities, a second subset of one or more objects corresponding to the set of one or more ledgers, and a third subset of one or more objects corresponding to an accounting calendar. The set of objects may be based at least in part on the first subset of documentation attributes, the second subset of documentation attributes, and the information indicative of the enterprise structure. Based at least in part on the set of objects and the accounting program, a first series of transaction records of a first transaction type may be generated so that each transaction of the first series of transactions is associated with the first subset of documentation attributes. Based at least in part on the set of objects and the accounting program, a second series of transaction records of a second transaction type may be generated so that each transaction of the second series of transactions is associated with the second subset of documentation attributes.

In various embodiments, the documentation attributes may include a set of attributes pertaining to sequencing requirements. Various embodiments may include processing an indication of one or more user selections of one or more sequencing options, where the generating the set of objects to facilitate setup of the accounting program is further based in part on the one or more sequencing options. Various embodiments may include receiving an initialization document via a user interface and deriving the information indicative of the enterprise structure and the indication of one or more user selections of sequencing options from the initialization document. In various embodiments, the one or more sequencing options may include an initial sequence value, a frequency of sequence restart, and a sequence restart value.

In various embodiments, the generating the set of objects to facilitate setup of the accounting program may include populating one or more of the set of objects with metadata pertaining to the first subset of documentation attributes and the second subset of documentation attributes. In various embodiments, the sequencing requirements may include one or more of a requirement to sequence by ledger, a requirement to sequence by legal entity, a gapless sequencing requirement, a requirement for chronological ordering based on document date, a requirement for sequencing based at least in part on a time of period close, a requirement for sequencing based at least in part on a time of accounting, and/or a requirement for sequencing based at least in part on a time of posting.

In various embodiments, the computer system may be configured to execute the accounting program based at least in part on the set of objects. The executing the accounting program may include the generating and saving the first series of transaction records of the first transaction type and the generating and saving the second series of transaction records of the second transaction type.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the following appended figures.

FIGS. 6A, 6B, and 6C illustrate portions of a spreadsheet via which enterprise structure may be captured, in accordance with certain embodiments of the present disclosure.

FIG. 7B illustrates some non-limiting examples of default document sequence categories to facilitate automatic sequencing configuration, in accordance with certain embodiments of the present disclosure.

FIG. 9A shows an example of a rapid implementation request log extract for sequencing rules configuration and enforcement for the transaction type of payable invoices, in accordance with certain embodiments of the present disclosure.

FIG. 9B shows an example of a rapid implementation request log extract for sequencing rules configuration and enforcement for the transaction type of payments, in accordance with certain embodiments of the present disclosure.

FIG. 12 shows an example of a rapid implementation request log extract for sequencing rules configuration and enforcement for journal sequences, including subledger journals and general ledger journals, in accordance with certain embodiments of the present disclosure.

Figure 1:
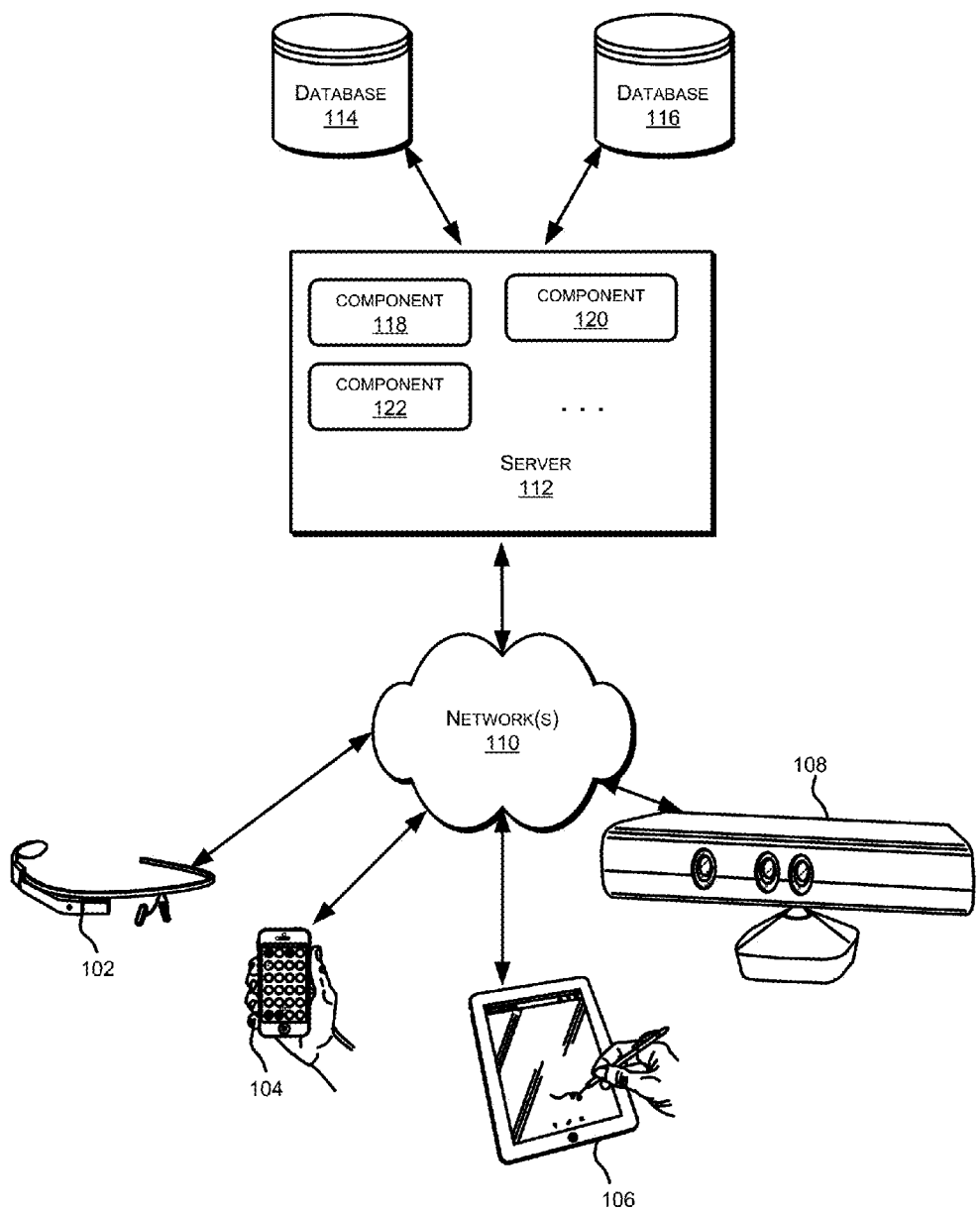
FIG. 1 depicts a simplified diagram of a distributed system, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Certain embodiments according to the present disclosure may provide for accelerated setup of accounting and document sequencing for financial systems for international regulatory requirements. Certain embodiments may provide for creating a plurality of ledgers, a plurality of legal entities, and different kinds of objects. Transactions may be associated with each of these sets of objects. For example, transactions may include one or more of invoices, credit memos, debit memos, and/or other transactions of any suitable kind. Thus, with the example of invoices that may be required to conform to a particular country's regulations, when the invoices are being created, the invoices should be in a sequential order, in a particular manner. The invoices should start from a particular number; should end at another particular number; should be in date sequence, in chronological manner; etc.

Certain embodiments may provide a solution to simplify the setup and implementation of Oracle Fusion Applications. Certain embodiments may simplify and hasten setting up the required document sequences across Oracle Fusion modules, making it much easier to implement the accounting system software. Some embodiments may be based on utilization and extension of the Oracle Fusion Enterprise Structures Rapid Implementation infrastructure. A set of embodiments may leverage the Oracle Fusion Enterprise Structures Rapid Implementation infrastructure to provide a centralized and scalable mechanism for the accelerated setup of document and accounting sequencing for financial systems, along with many other key enterprise structure reference data setups required for a financial software application. Sequences may be automatically generated for each legal entity and/or ledger as well as related subledger setups in a manner that conforms to country-specific regulatory requirements. Certain embodiments offer simplicity of use, many performance benefits, and minimal user input.

A set of embodiments may create automated enterprise structure setups, including sequencing options, through a spreadsheet and HTML interface. A worksheet may be where certain options for specified attributes are captured. The options may include, for example, the frequency at which sequences are to be restarted. The frequency could be monthly, annually, etc., depending on the specific rule. As another example, the options may include an initial value at which sequencing may be start, restart value(s), and/or the like. In some cases, such values may be dictated or otherwise limited by regulatory rules. In some cases, such values may be user-specified. And, in some cases, such values may be user-specified, but limited/constrained by the system to conform to regulatory rules.

In some embodiments, initialization procedures in modules in accounting program may be automatically executed by one or more servers, e.g., by invoking an API. Based on simple input from the user in a setup spreadsheet, for each of the document types, categories may be pre-seeded, and metadata may be populated across underlying tables so that the transactions are ready for creation in compliant manner. Sequence versions may be automatically created according to the specified attributes, including the initial value for each sequence by transaction source, as well as the sequencing reset and restart frequency, in order to ensure gapless and chronological assignment of a sequence number to transaction documents during posting or close of an accounting period. The definition and assignment of the new sequences may be done using an API in certain embodiments. For example with respect to receivables setup objects: transaction types, receivables activity adjustments, and receipt methods can have document sequencing enabled. When creating one of these new setup objects (transaction types, receivables activity adjustments, and receipt methods), upon saving of these setups, a document sequence assignment API may be called to automatically create new document sequences and assign appropriate versions for each sequence-enabled ledger and/or legal entity to the setup objects. These new document sequences may inherit the same attributes from the default sequences that were created via the uploaded spreadsheet. Thereafter, not only may users automatically access all the ledgers that are linked to each of the countries to which the legal entities belong, but also, as transactions are entered, the transactions automatically conform to the regulatory requirement(s) (e.g., a user does not need to enter anything as far as sequences are concerned).

Certain embodiments may obviate any need for sequencing options to be set up for each transactional document type and legal entity and/or ledger. With embodiments of this disclosure, such a cumbersome and time-consuming process, involving separate navigation steps across multiple setup flows, is not necessary. Some embodiments may provide a solution that is particularly advantageous to cloud users by accelerating setups that factor in country-specific regulatory requirements around document and accounting sequencing and offering a more centralized, consistent, and comprehensive approach as users plan, configure, and set up their financial system. Users will not need to navigate to multiple setup pages to complete setups. With this solution, the speed and ease with which the system can be set up will allow users to be up and running in the shortest possible time and with minimal effort.

With some embodiments, sequencing options for the financial application may be derived based at least in part on seeded country-specific defaults. For each seeded transaction class and journal type, relevant document and journal sequences and assignments for each legal entity or ledger may be generated automatically based at least in part on country-specific defaults. Sequences may be generated for each legal entity in a ledger for the countries that require it, and a single sequence for the whole ledger for countries that do not have that requirement. For example, sequences may be enabled at the legal entity level for countries with such a requirement, like Spain, Italy, and France.

Certain embodiments may provide a solution that is also highly scalable. For example, if there are 10 ledgers and 100 legal entities defined in a given system, an acceleration engine may automatically utilize seeded country-specific information to generate the corresponding sequencing options for each of these ledgers and legal entities. The information generated may then be automatically populated into respective subledger setup objects. Along with other components of the setup, this may complete the configuration of the financial application system and may allow users to immediately start entering transactions. As organizations add more legal entities or ledgers to their system, certain embodiments can readily generate the necessary sequencing setups for as many legal entities and ledgers as system-defined.

For two key subledger modules of payables and receivables, a document sequence may be created for each subledger transaction line item, and seeded default transaction categories may be assigned to the sequence with the according initial sequencing values, reset, and restart options, and sequence version for each accounting period. For a general ledger module, a reporting or accounting sequence may be created for each journal line item.

For countries, such as Italy, that require sequencing to be gapless and chronological, reporting sequences that conform to these requirements may also be created. Accounting sequences may be applied when the accounting is generated for subledger transactions or during the posting of general ledger journals, whereas reporting sequencing may be applied at the close of the accounting period when no additional transactions can be created for the period and can thus all be accounted for. Reporting sequences can guarantee gapless sequencing, but accounting sequences may be required to ensure chronological ordering since back-posting a transaction with an older date may be possible as long as the accounting period is still open.

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Various embodiments will now be discussed in greater detail with reference to the accompanying figures, beginning with FIG. 1.

FIG. 1 depicts a simplified diagram of a distributed system 100 for implementing certain embodiments in accordance with present disclosure. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 102.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
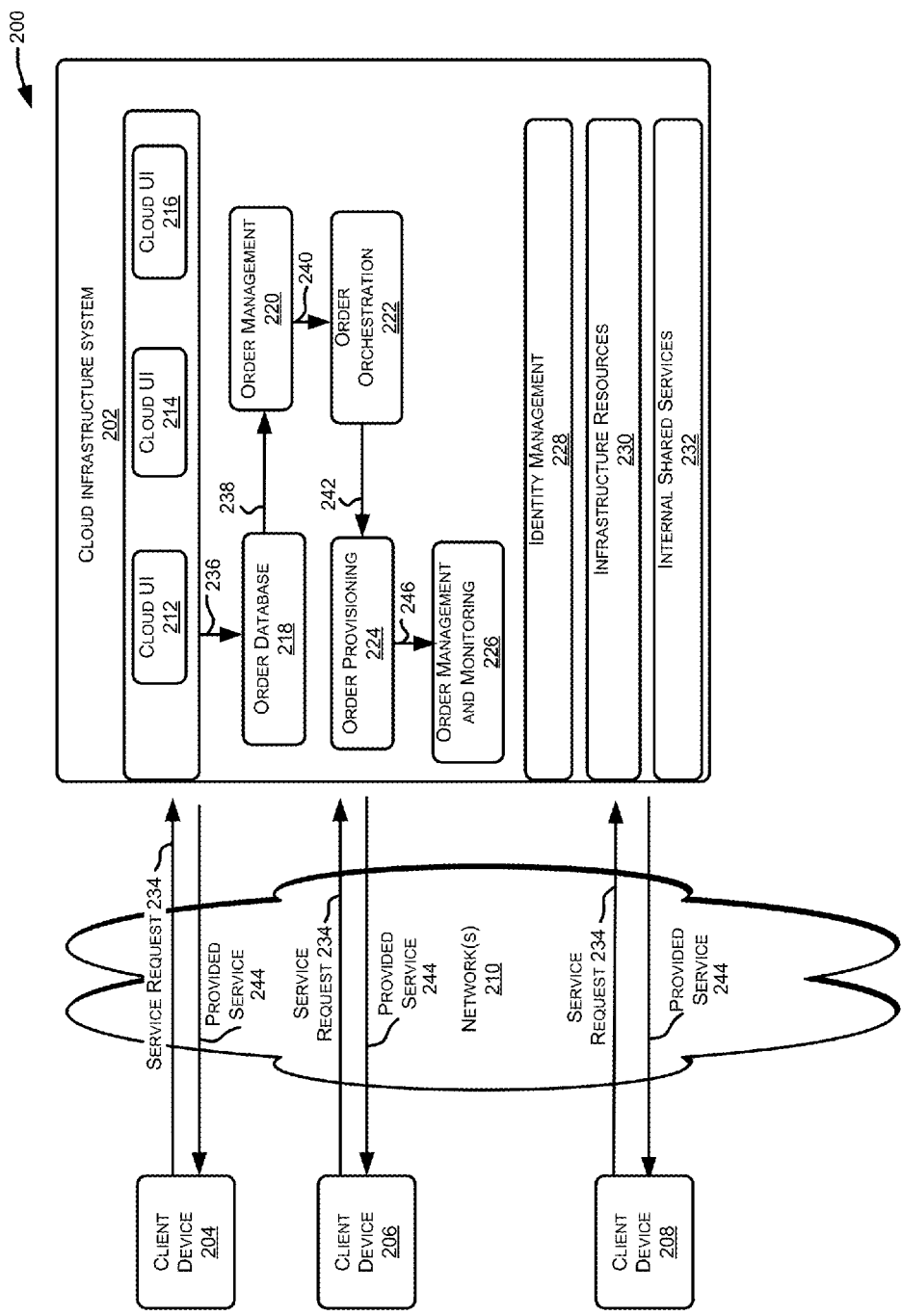
FIG. 2 is a simplified block diagram of components of a system environment by which services provided by the components of an embodiment system may be offered as cloud services, in accordance with an embodiment of the present disclosure.

FIG. 2 is a simplified block diagram of one or more components of a system environment 200 by which services provided by one or more components of a system may be offered as cloud services, in accordance with certain embodiments of the present disclosure. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108. Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110. Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform. In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like. In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In certain embodiments, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216. At operation 236, the order is stored in order database 218. Order database 218 can be one of several databases operated by cloud infrastructure system 218 and operated in conjunction with other system elements. At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206, and/or 208 by order provisioning module 224 of cloud infrastructure system 202. At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.). Identity management module 228 may also include the management of descriptive information about each customer and about how and by whom that descriptive information can be accessed and modified.

Figure 3:
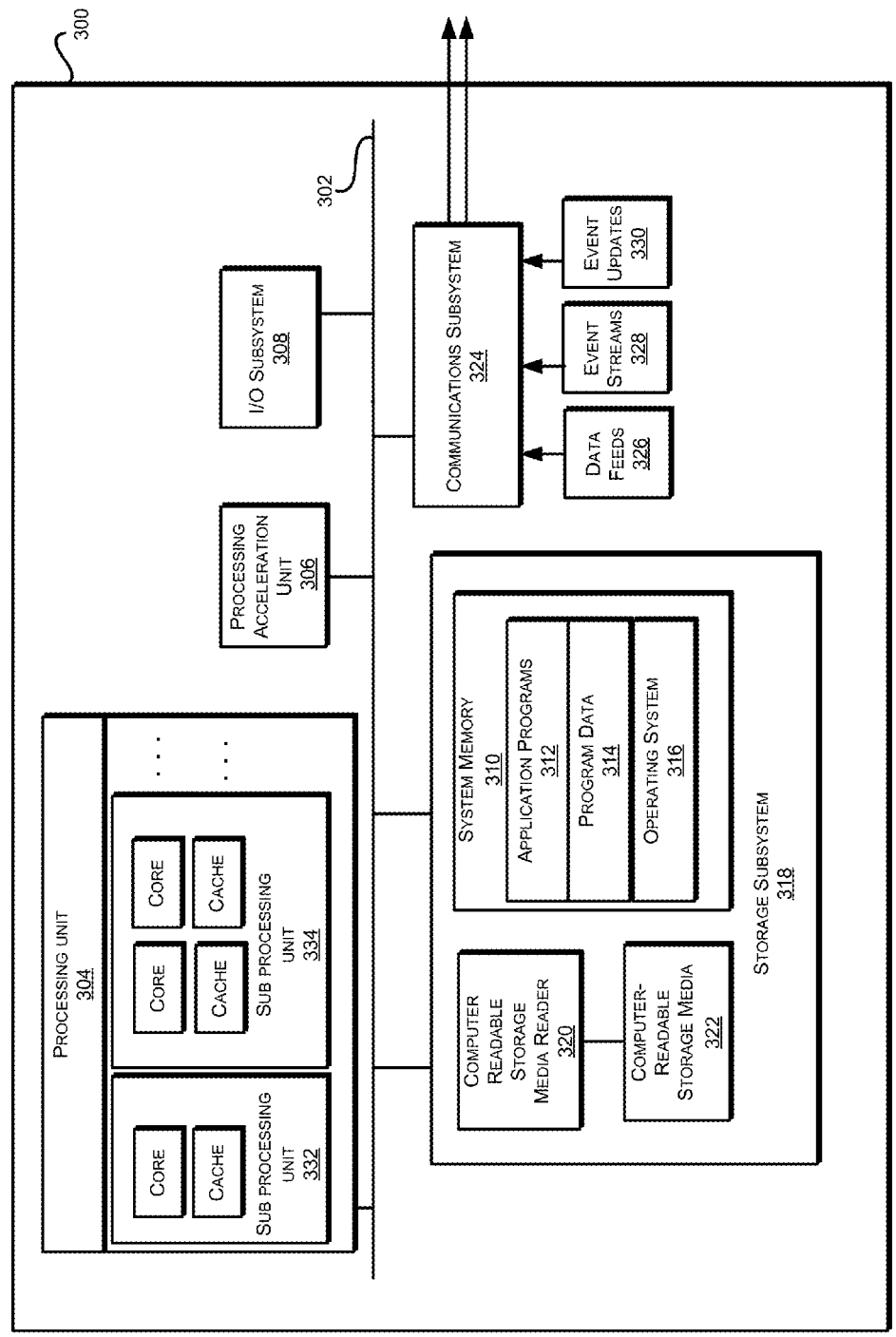
FIG. 3 illustrates an exemplary computer system, in accordance with certain embodiments of the present disclosure.

FIG. 3 illustrates an exemplary computer system 300, in which various embodiments of the present invention may be implemented. The system 300 may be used to implement any of the computer systems described herein. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like. In some embodiments, the processing acceleration unit 306 may include or work in conjunction with an acceleration engine such as that disclosed herein to improve computer system functioning.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs. Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 30 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300. By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like. Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system. Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4A:
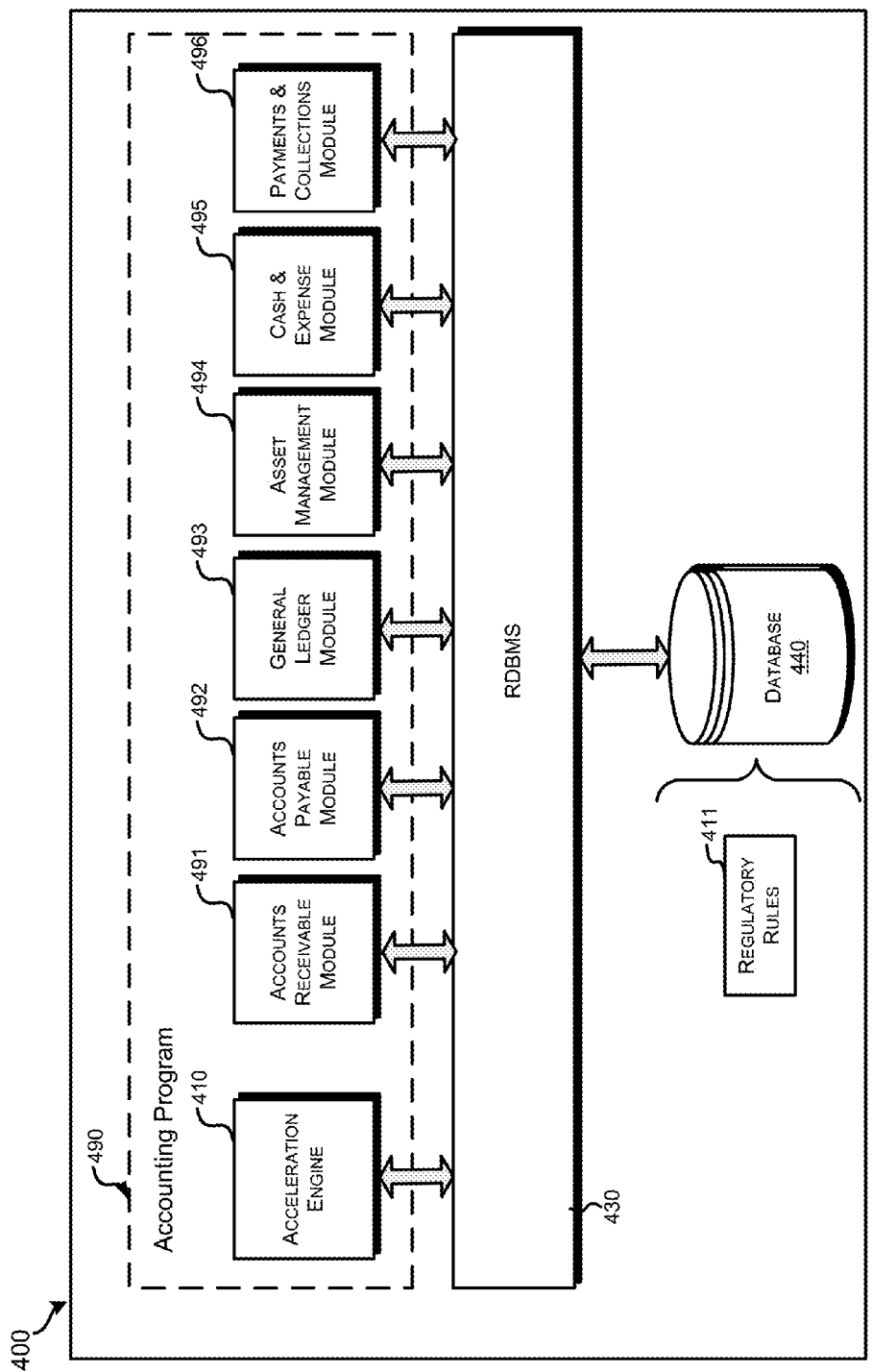
FIGS. 4A and 4B are block diagrams of one or more servers to perform one or more acceleration features disclosed herein, in accordance with certain embodiments of the present disclosure.
Figure 4B:
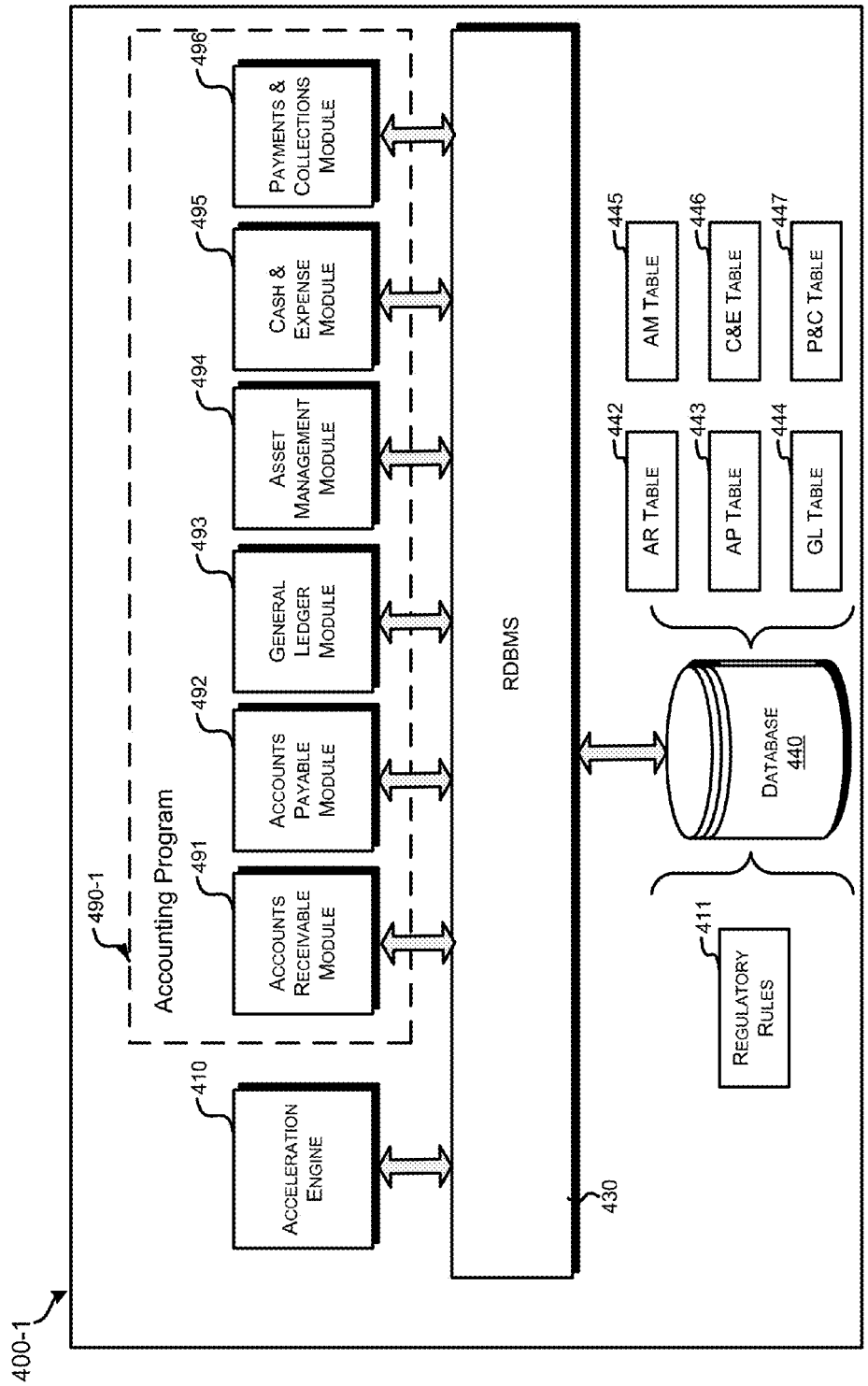

FIGS. 4A and 4B are block diagrams of one or more servers 400 to perform one or more acceleration features disclosed herein, in accordance with certain embodiments of the present disclosure. One or more of engines, modules, and subsystems 402 may be configured to perform any of the steps of methods described in the present disclosure. Certain embodiments improve the functioning of a computer system that accelerates system documentation conformance to differentiated regulations of multiple countries in an accounting program. As indicated by the figures, the one or more servers 400 may be configured to execute instructions to provide an accounting program 490. While certain components may be described separately, it should be understood that such components may be implemented in any suitable manner. In various embodiments, the one or more servers 400 may provide an acceleration engine 410 that is either internal to the accounting program 490 (e.g., as indicated by FIG. 4A), external to the accounting program 490 (e.g., as indicated by FIG. 4B), and/or partially internal/external to the accounting program 490.

The acceleration engine 410 may be a rapid implementation engine that may improve computer system functioning by accelerating system documentation conformance to differentiated regulations of multiple countries in conjunction the accounting program 490. The acceleration engine 410 may include logic for implementing rapid implementation features in various embodiments disclosed herein. In some embodiments, the acceleration engine 410 may include, provide, or otherwise facilitate one or more APIs (application program interfaces) in the process of implementing one or more rapid implementation features. The acceleration engine 410 may be configured to use regulatory rules 411, which may include any combination of rules to facilitate the features specific to particular countries, legal entities, ledgers, transaction types, document categories, and/or the like disclosed herein. The regulatory rules 411 may include mapping rules governing the handling of configuration and/or enforcement of sequencing for various attributes based at least in part on one or more of minimal user-input parameters, system-derived parameters, general defaults, and/or country-specific defaults. Examples of other modules in the accounting program 490 may include any one or combination of an accounts receivable module 491, an accounts payable module 492, a general ledger module 493, an asset management module 494, a cash and expense module 495, a payments and collections module 496, and/or the like.

Setup or organization of the accounting program 490 executing in a computer system may be performed in part by inputting information in a spreadsheet of a workbook by use of spreadsheet software, and then uploading the information to the accounting software. One example process is described as "Rapid Implementation" in a document entitled "ORACLE® Cloud Setting Up Financials: Quick Start," Release 13.1, Part Number E38515-01, published August 2013, available from Oracle Corporation, Redwood Shores, Calif. 94065, which document is incorporated by reference herein in its entirety. Additional pertinent information from Oracle Corporation may be available from another document entitled "Oracle® Fusion Accounting Hub Implementation Guide," 11g Release 7 (11.1.7), Part Number E20374-07, published March 2013, which document is also incorporated by reference herein in its entirety. Rapid Implementation uses user input in one or more spreadsheets to cause a computer system to create certain accounting structures such as a ledger, a chart of accounts, legal entities, and business units.

In a specific case, after having created the ledgers and the legal entities, there could be a plurality of ledgers for legal entities. Say there are ten ledgers and a hundred legal entities, to give an example. For each of these, a painful and elaborate process could involve accessing the respective user interfaces within the context of the ledgers and the entities, and then setting up the aspects to comply with regulatory requirements for each of the ledgers and entities.

As an example of a regulatory rule, say there was a country-specific sequencing requirement at the ledger level:

the numbering must be gapless for a specific kind of document for invoices. But that requirement may not apply to another specific kind of document. Thus, the sequencing definition is country-specific, ledger-specific, and document-type-specific. A painful and elaborate process may involve having to go to specific user interfaces and then creating a sequencing definition to associate with the respective document type and within context of each of the particular ledgers. A separate process may be limited to the particular ledgers and legal entities, and may not be applicable to the myriad different sequencings requirements and ledgers.

However, certain embodiments may provide for simplicity, delegation rather than manual effort, consistency, a centralized approach, a better user experience, reduced implementation effort, a reduction in support costs and implementation costs and other savings of time and money. The acceleration engine 410 may simplify the setup and implementation of the accounting program 490, simplifying and accelerating setting up the required document sequences across modules, making it much easier to implement the accounting program 490. The acceleration engine 410 may use a multiplicity of defaulting rules and country-specific rules 411, that are seeded, to automatically generate necessary information to use in conjunction with underlying tables so that transactions are entered in a manner that follows appropriate regulatory rules (e.g., sequencing rules) automatically. Metadata may be pre-seeded based on country level information, which may allow for any scalability because the ledgers and legal entities may be set up at an initial stage of the application to conform to the regulatory rules.

The acceleration engine 410 may configure and/or otherwise use one or more tables in the database 440. Each module in accounting program 490 may use its own module-specific table in database 440 to process its transactions. For example, accounts receivable module 491 uses an accounts receivable table 442, accounts payable module 492 uses an accounts payable table 443, general ledger module 493 uses a general ledger table 444, asset management module 494 uses an asset management table 445, cash and expense module 445 uses cash and expense table 446, and payments and collections module 496 uses a payments and collections table 447.

In an illustrative use case example, a user may use a screen in an accounts payable module 492 (or other module) in the accounting program 490 to create an invoice (or other transaction) that stores entries in one or more setup accounts. Specifically, a user may open a screen of a module in the accounting program 490 to create an accounting transaction (e.g., an invoice), and the screen may display a field requiring user input to identify a business unit or a legal entity. Based on this user input, one or more accounts are automatically identified, by the module looking up its corresponding module-specific table, which may be configured by the acceleration engine 410 so that transactions are created and/or saved in a manner that follows appropriate regulatory rules (e.g., sequencing rules) automatically. For example with payables invoices, whenever a user creates an invoice, the document category may automatically get defaulted and a voucher number may get generated for the payables invoice.

Figure 5:
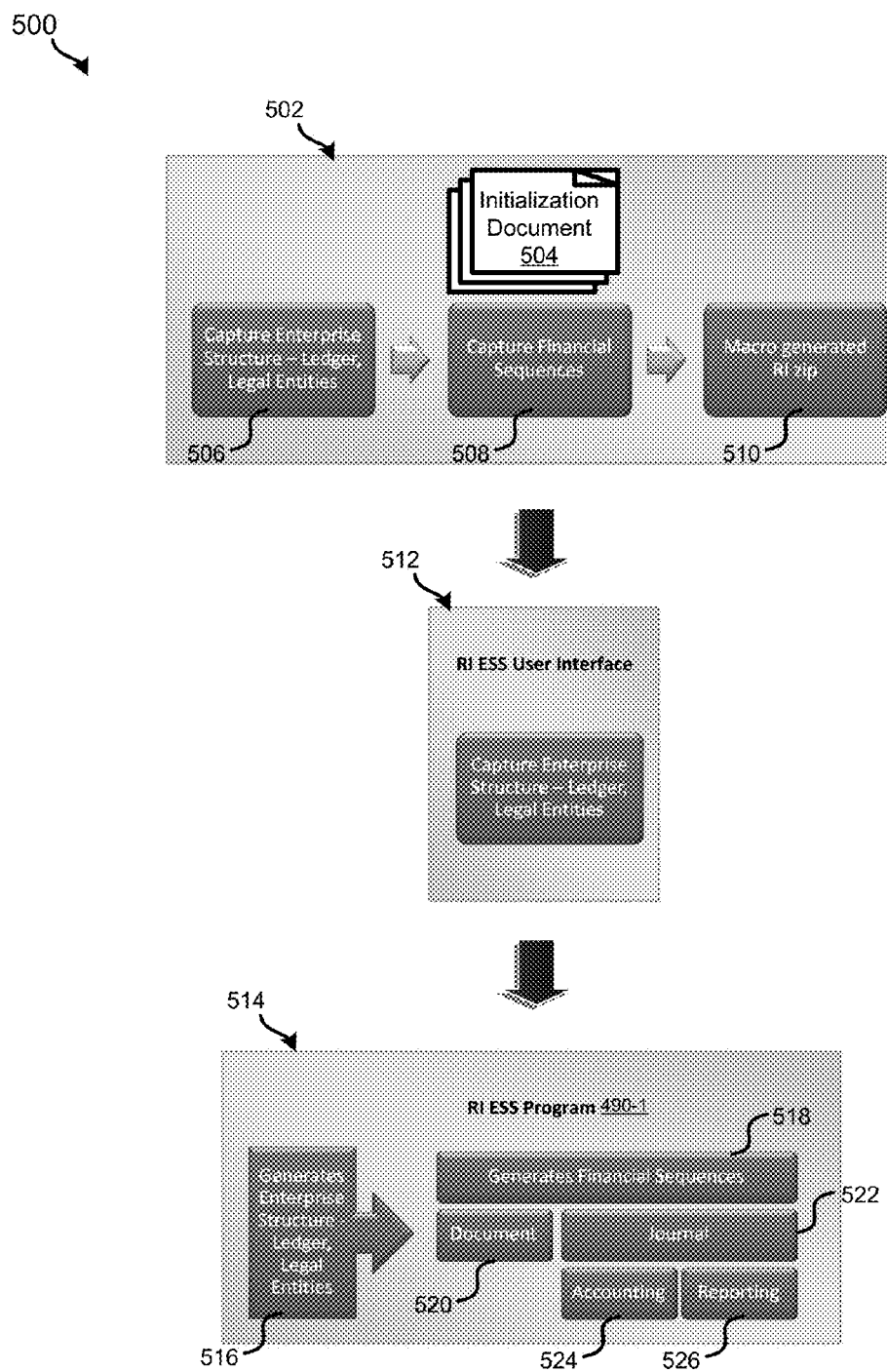
FIG. 5 is a block diagram of a flow of a rapid implementation for enterprise structures to enforce financial sequences, in accordance with certain embodiments of the present disclosure.

FIG. 5 is a block diagram of a flow 500 of a rapid implementation for enterprise structures to enforce financial sequences, in accordance with certain embodiments of the present disclosure. While the example of flow 500 and other example embodiments disclosed herein are illustrated with respect to sequence regulations, other embodiments may be similarly implemented with respect to other types of regulations. At an initial stage 502 of the flow 500, a common financials configuration and an enterprise structures configuration may be defined.

To create ledgers and legal entities, an initialization document 504 may be used. The initialization document 504 may specify one or more charts of accounts, one or more ledgers, one or more legal entities, and/or one or more business units. In some embodiments, one or more spreadsheets 504 (e.g., a workbook) may be used and may be received from a user by one or more computers executing spreadsheet software. A user could, for example, download the spreadsheet 504 and configure the enterprise structure. The configuration data may be spread out on more than one worksheet. In the initialization document 504, an enterprise structure may be captured, as indicated by block 506. In some embodiments, indicia of financial sequence options may be captured, as indicated by block 508. In some embodiments, the minimal parameters entered by the user may form the basis of a macro-generated file 510 corresponding to the initialization document 504.

Since the initialization document 504 captures country information about a particular implementation, country-specific defaults can be enforced in the automated enterprise structure setups for the sequences component, along with ledgers, legal entities, and business units. In some embodiments, two XML data files may be generated from the initialization document 504. The first data file may be used to create the chart of accounts, segment values, and their trees. The second file may be used to create ledger, business unit, and legal entities. Sequence data may be added to the second data file.

Parameter capture may be facilitated by a user interface 512. The minimal parameters may be uploaded via the user interface 512. In some embodiments, an API (e.g., a Java API) may be provided to accept the parameters entered by the user. In some embodiments, sequences may be configured and created consequent to upload. In order to create financial sequences, the upload process may set the ledger options for each ledger and call necessary APIs to create financial sequences and their versions. Sequences may be created based on the user inputs, derivations, general defaults, and any country specific defaults. Any country-specific default may override the general defaults. For example, Italy legal entities would need not only gapless sequences but also chronological sequences. The sequence attribute values may be based on the mapping rules of the regulatory rules 411.

At an acceleration stage 514, based in part on the minimal user-provided parameters, the acceleration engine 410 may generate the enterprise structure(s) 516 and generate the remaining parameters. The underlying tables may be populated with the parameters, and the process to define, assign, and generate the sequences 518 for different transaction types may be initiated. In some embodiment, one primary ledger may be generated for each country specified. Depending on the configuration, there can be one or more legal entities assigned to a primary ledger. Thus, different types of sequences (and/or other country-specific requirements) may be set up, such as for document 520, and journal 522 (accounting 524, and reporting 526).

Figure 6A:
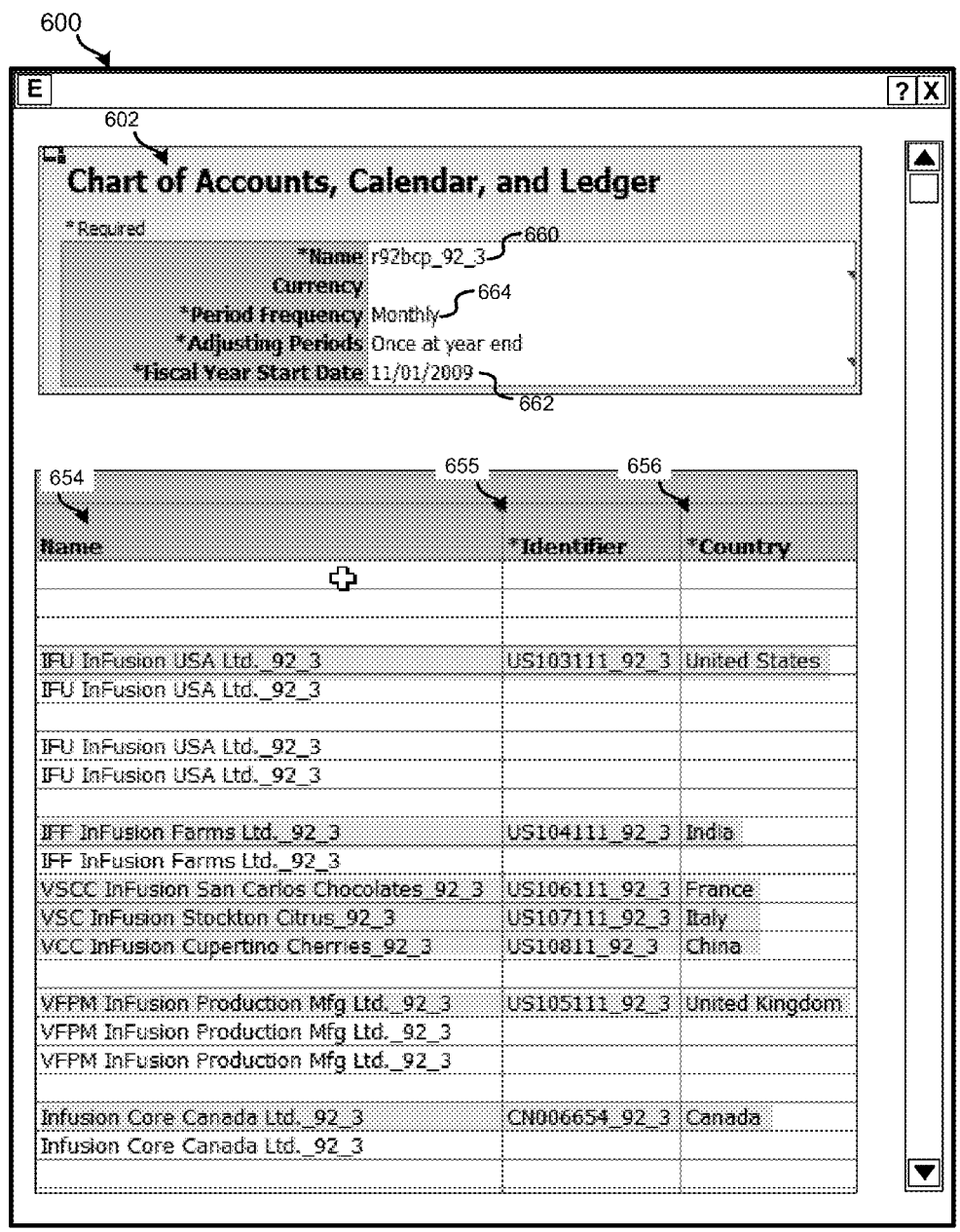
Figure 6C:
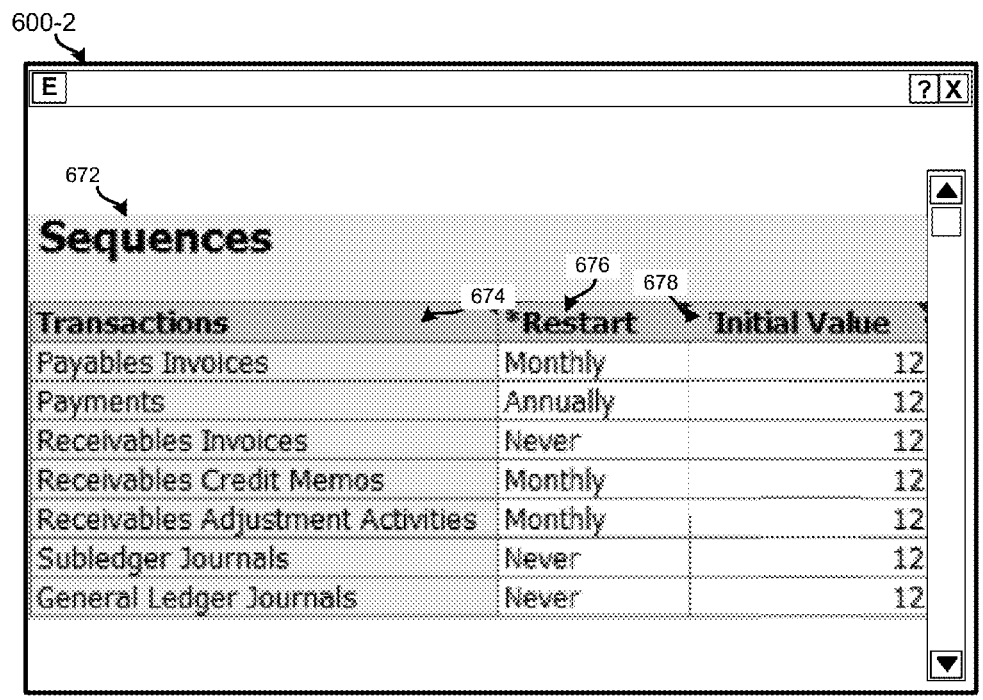

By way of example, a capture flow may include one or more of the following. One or more charts of account structure, ledgers, calendars, and/or business units may be defined. FIGS. 6A, 6B, and 6C illustrate portions of a spreadsheet 600 via which enterprise structure may be captured, in accordance with certain embodiments of the present disclosure. Chart field values and a tree for each chart field (segment) may be defined. As illustrated, the spreadsheet 600 may include a chart of accounts, calendar, and ledger 602. Legal entities and their locations may be defined, with each legal entity corresponding to one or more business units. In the example depicted, various legal entities 652 are specified by legal entity name 654, by unique identifier 655, and by legal entity country 656. An accounting calendar 658 may be specified by name 660, start date 662, and period frequency 664. Ledgers 666 may be specified by ledger name 668 and countries 670 corresponding to legal entity addresses. Such specification may, for example, be performed in accordance with embodiments disclosed in U.S. patent application Ser. No. 14/553,097 filed Nov. 25, 2014, entitled "Setup of a Computer System That Executes an Accounting Program," the entire disclosure of which is hereby incorporated by reference.

Sequences 672 (document and journal) may be defined. The depicted example sequences 672 may illustrate a set of sequence definitions for a particular country. In some embodiments, an additional worksheet may be configured to accept input from the system implementer to create default sequences, versions, and assignments. The spreadsheet 600 may allow for specifications for sequences 672 for a plurality of transaction types 674. The transactions 674 may include one or more seeded transactions, transaction classes, and/or journal types. For each enabled line item, a sequence 672 may be created for each legal entity or ledger depending on the ledger options setting. In some embodiments, for the receivables line items, a sequence may be created for each line item and category assigned to it. Reporting and accounting sequences may be created for the last two line items—subledger journals and general ledger journals. Document sequences may be created for the other line items.

An initial value 678 may be specified for each sequence. The initial value 678 may be the same for all versions in some embodiments. If enabled, any whole number greater than or equal to 1 may be provided. If the country defaults do not require sequencing for the transaction type, then the initial value may be ignored.

Figure 7A:
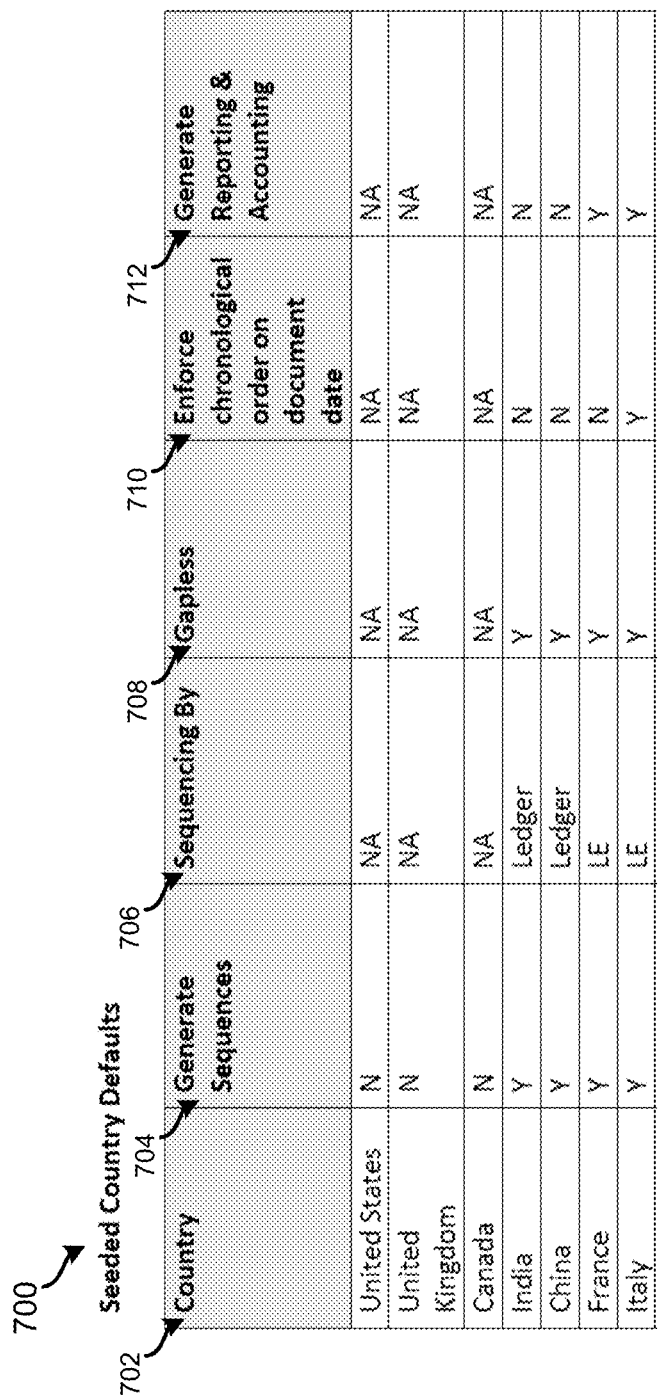
FIG. 7A illustrates some non-limiting examples of seeded country defaults to facilitate automatic sequencing configuration, in accordance with certain embodiments of the present disclosure.

For payables line items, a document sequence may be created for each line item, and the seeded default categories may be assigned to the sequence. For receivables line items, a document sequence may be created for each line item, and seeded default category may be assigned to the sequence. For journal line items, a journal (reporting or accounting) sequence may be created for each enabled transaction and legal entity or ledger as set in the ledger options (FIG. 7A). For example, for a France ledger, the sequence by option 706 (e.g., FIG. 7A) is set to legal entity, and accounting sequences may be created for each legal entity located in France.

The sequence restart 676 may specify if the sequence needs to be reset and re-started periodically. There may be one version for each period for the sequence. The number of versions that can be created may depend on the restart value 676 specified and the number of years per the ledger calendar. For example, say the fiscal calendar creates a calendar for 2 years—2015 and 2016 and the specified restart is yearly, then two versions may be created for each year—2015 and 2016. In some embodiments, by default, the fiscal calendar of the primary ledger may be used for the sequence date ranges and versioning. However, this can be overridden by country defaults. A drop list may be provided to allow selection of a valid value, such as yearly, monthly, never, and/or the like. If the country defaults do not require sequencing for the transaction type, then the restart value may be ignored. If restart is set to monthly, the date ranges for each version may be obtained from the accounting period definitions of the ledger calendar. If restart is set to null, only one version may be created. The start date may be the fiscal year start date, and the end date may be null. For naming purposes, the first year for the version followed by a sequence number may be used.

Sequences 672 may be created for each legal entity 652 and/or ledger 666 based on the seeded country defaults. Default values for countries may be stored in seeded templates. Global countries document sequencing defaults and seeded categories may be used to create default sequences, versions, and assignments. For example, Italian document sequencing settings may typically include following. Document sequencing date correlation may be enforced at legal entity level so that it is always used. Annual versioning of document sequences may be enforced with an initial value of document sequence numbers in every year being one (1). Document sequence numbering may be enforced so that it is gapless. Document creation may be automatic.

The acceleration engine 410 may make use of default values to create set up objects. In some embodiments, two sets of defaults may be defined and stored for sequencing—general and country-specific. The rapid implementation process may apply the general defaults first and the country-specific defaults may override general defaults. For example, by general default, sequencing may be enabled at the ledger level. For some countries, like Spain and Taiwan, the general default may be overridden by country defaults and sequences may be set at the legal entity level. If default data is effective dated (versioned), then it may be ensured that, for every sequence version created, the default data used is current as of the sequence version being created. For example, for some XYZ country mandating sequencing requirement, there may be two versions: version 1—until 2014, type of sequencing needed is gapless; version 2—starting from 2015, the type of sequencing needed is gapless and chronological. So, while creating a sequence version for 2014, default version 1 may be used; when creating a sequence version for 2015 and beyond, default version 2 may be used.

FIG. 7A illustrates some non-limiting examples of seeded country defaults 700 to facilitate automatic sequencing configuration, in accordance with certain embodiments of the present disclosure. In some embodiments, the seeded country defaults 700 could be pre-seeded in the initialization document; in some embodiments, the seeded country defaults 700 could be pre-seeded in the system 400 (e.g., in the regulatory rules 411). Using the example regulatory aspect of sequences, for each country 702, the seeded country defaults 700 may specify one or a combination of: whether sequences are to be automatically generated (704); whether sequences are required at the ledger level and/or legal entity level (706) so that the sequences may be automatically generated at the required level; whether there is a requirement that the sequencing be gapless (708); whether chronological order on the document date is be enforce (710); and whether to generate reporting and accounting for the sequences (712). Other embodiments may include other attributes pertaining to regulatory requirements specified as seeded country defaults 700.

Figure 8:
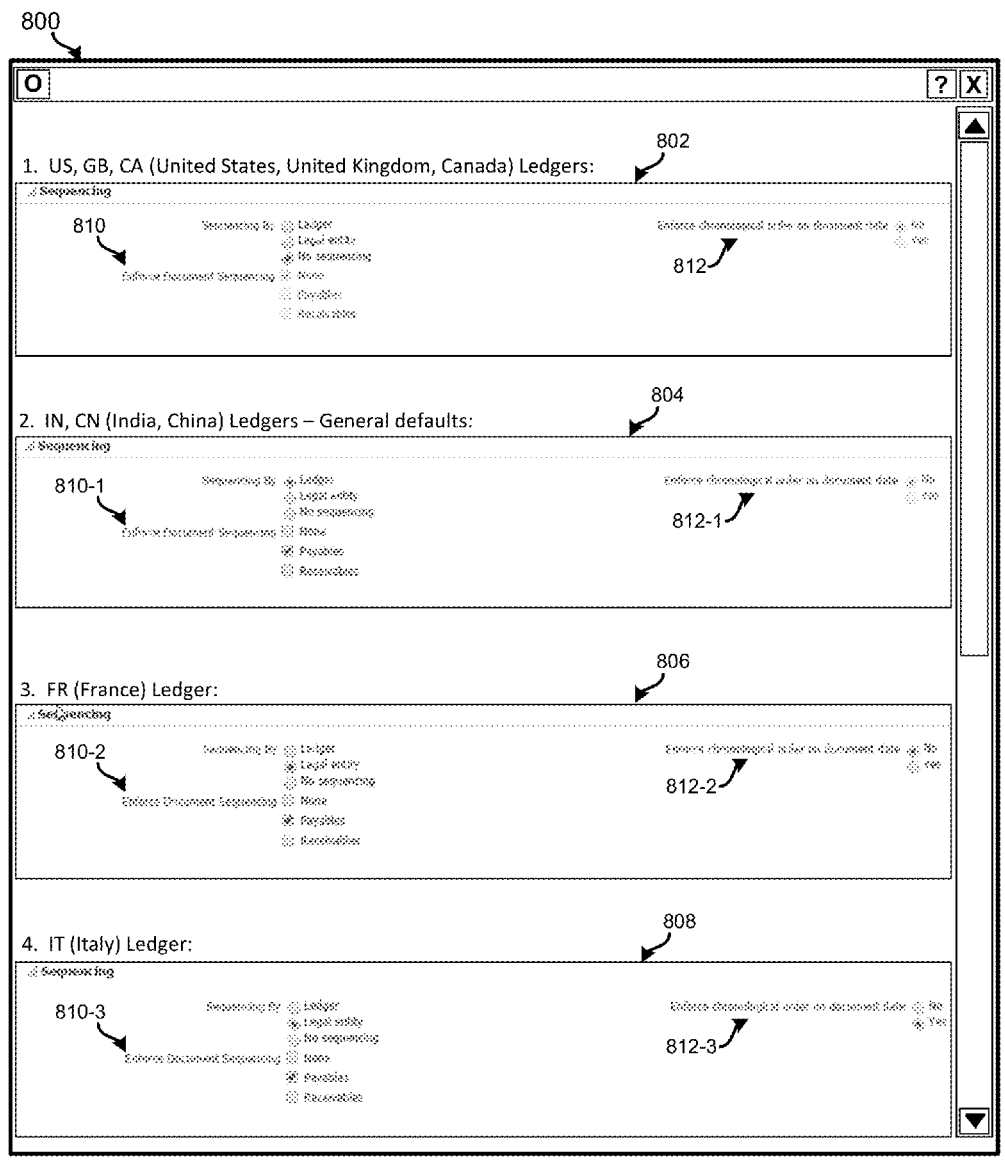
FIG. 8 illustrates the user interface of a setup manager, in accordance with certain embodiments of the present disclosure.

Based on the seeded country defaults 700, one or more ledger options may be automatically specified. The user interface may present the specified ledger options along with user-selectable options to allow for management of sequencing. FIG. 8 illustrates the user interface 800 of a setup manager, in accordance with certain embodiments of the present disclosure. The setup manager may be provided by the accounting program 490 and/or the acceleration engine 410 in some embodiments. To allow for selection of ledger scope, the setup manager may be provide ledgers sequencing 802, 804, 806, 808 for particular countries with user-selectable options configured to allow for customization of automatically specified attributes. An enforce document sequencing option 810 may be a ledger option to enforce document sequencing for certain types of transactions, such as payables transactions and receivables transactions. An enforce document sequence date correlation option 812 may be available. This option 812 may ensure gapless sequencing.

Figure 10:
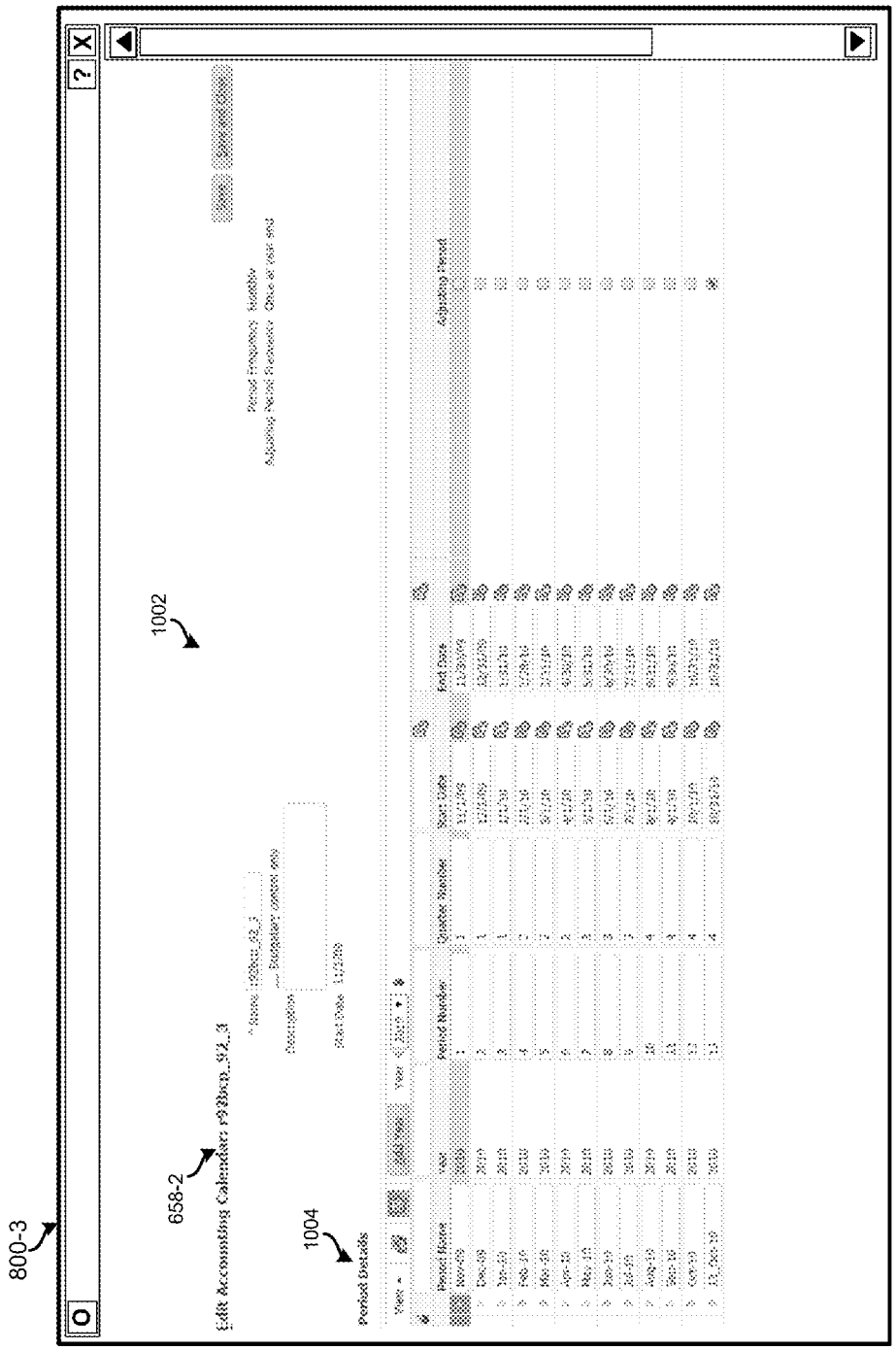
FIG. 10 shows an example view of an interface to allow for presentation and editing of aspects of an accounting calendar, in accordance with certain embodiments of the present disclosure.

FIG. 9A shows an example of a rapid implementation request log extract 902 for sequencing rules configuration and enforcement for the transaction type of payable invoices 974, in accordance with certain embodiments of the present disclosure. FIG. 9B shows an example of a rapid implementation request log extract 952 for sequencing rules configuration and enforcement for the transaction type of payments 975, in accordance with certain embodiments of the present disclosure. In various embodiments, one or more APIs may be invoked to handle sequencing rules configuration and/or enforcement. The example method to create document sequences may be based in part on specified parameters for the example accounting calendar 658-1. FIG. 10 shows an example view 1002 of an interface 800-2 to allow for presentation and editing of aspects of an accounting calendar 658-2, in accordance with certain embodiments of the present disclosure. As depicted in the example, period details 1004 may be displayed and managed with various user-selectable options.

Referring again to FIGS. 9A and 9B, based at least in part on particular country rules, country-specific, ledger-specific document sequence versions 904 may be handled for various countries and ledgers. A document sequence name 906 may correspond to a name of a sequence that may be used to generate a unique number for the transaction document when it is created. A sequence name may be formed using the particular version (e.g., year or month/period—which could be designated with six or some other suitable number of characters) and a suffix that is a system-generated gapless sequence number to ensure unique names (e.g., five or some other suitable number of characters).

A document sequence category 908 may correspond to a name of a transaction type to which a sequence is assigned.

FIG. 7B illustrates some non-limiting examples of default document sequence categories 750 to facilitate automatic sequencing configuration, in accordance with certain embodiments of the present disclosure. The document sequence categories 750 may be classified and coded according to transaction type 752 and transaction subtype 754. Thus, by way of the example depicted in FIG. 9A, document sequence categories 908 may be seeded for categories such as credit memo invoices ("CRM INV"), debit memo invoices ("DBM INV"), interest invoices ("INT INV"), payment request invoices ("PAY REQ INV"), prepayment invoices ("PREPAY INV"), standard invoices ("STD INV"), and/or the like. Such categories may default when an invoice of the particular type is created and the sequencing may be generated based on the sequence assigned to the above category. Transactions of a particular transaction type may get a unique number assigned when the transactions are created. With the example of ledger r92bcp_92_3 IN (904-1), payables payment document sequence 2010-01-233f (906-1) is assigned to the ledger and particular document sequence categories 908 to comply with India regulatory rules. In some embodiments, if sequencing is set as per legal entity, then one sequence per legal entity may be generated such that same sequence will be assigned to all invoice types. Alternative embodiments may involve different sequences being assigned to different invoice types.

For different transaction types 674, such as payments, document sequences may be based in part on different specified parameters, such as a different sequence restart 676, initial values 678, and/or the like. Different transaction types 674 may have different document sequence categories 908. By way of example, payments may be categorized according to payment methods such as check payment, wire payment, clearing, electronic funds transfer, and/or the like.

Figure 11:
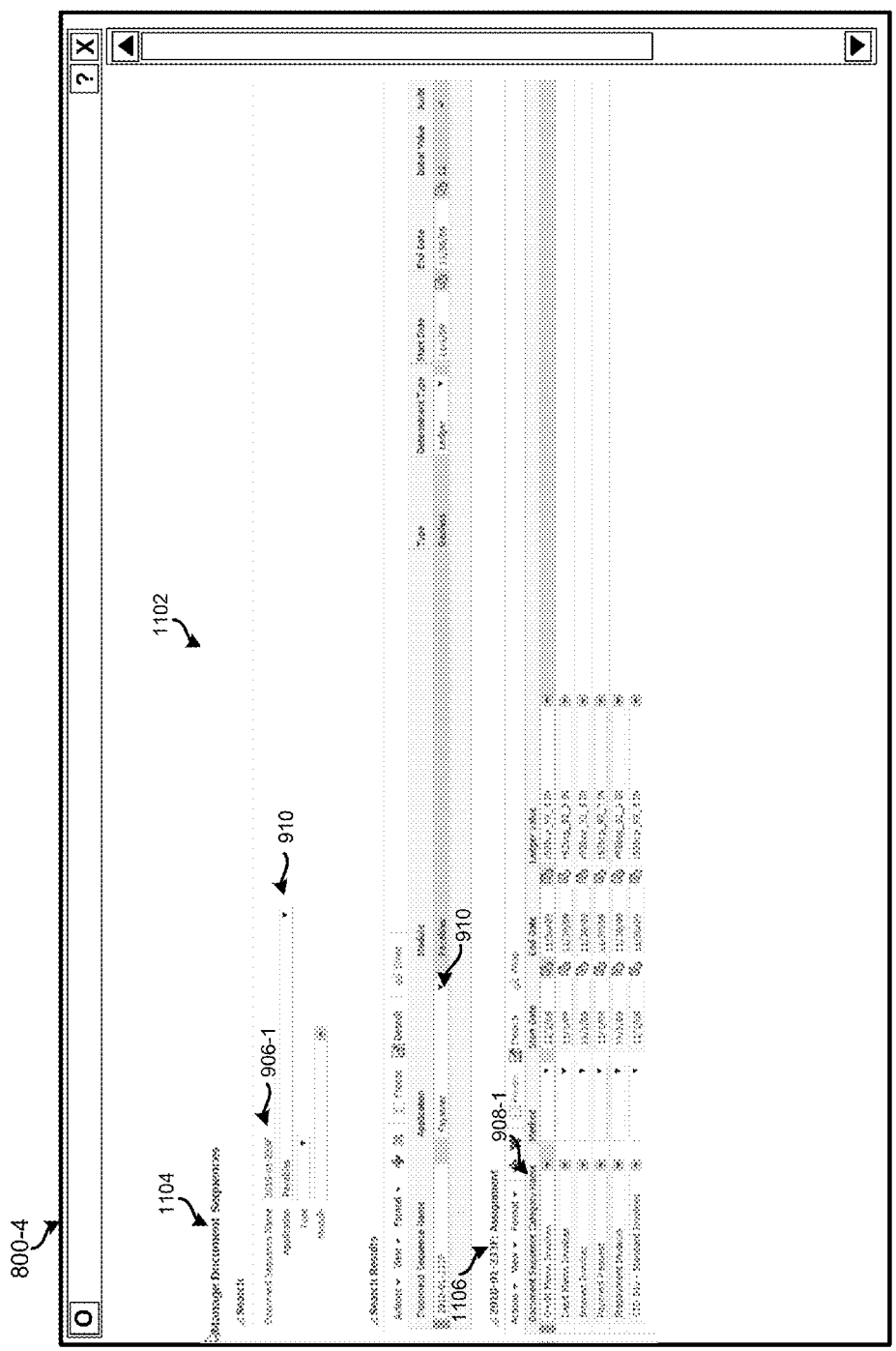
FIG. 11 shows an example view of an interface to allow for presentation and editing of aspects of document sequences, in accordance with certain embodiments of the present disclosure.

FIG. 11 shows an example view 1102 of an interface 800-4 to allow for presentation and editing of aspects of document sequences, in accordance with certain embodiments of the present disclosure. As depicted in the example, document sequence details 1104 for document sequence 2010-01-233f (referenced with 906-1) may be displayed and managed with various user-selectable options. The document sequence details 1104 may include assignment details 1106 for the particular document sequence categories 908. User-selection options for various transaction types 910 may be provided to allow for similar accessing and editing aspects of document sequences for other transaction types 674. Thus, while the depicted example references payables, the interface 800-4 may allow for presentation and editing of aspects of other document sequences, such as payment sequences.

Figure 13A:
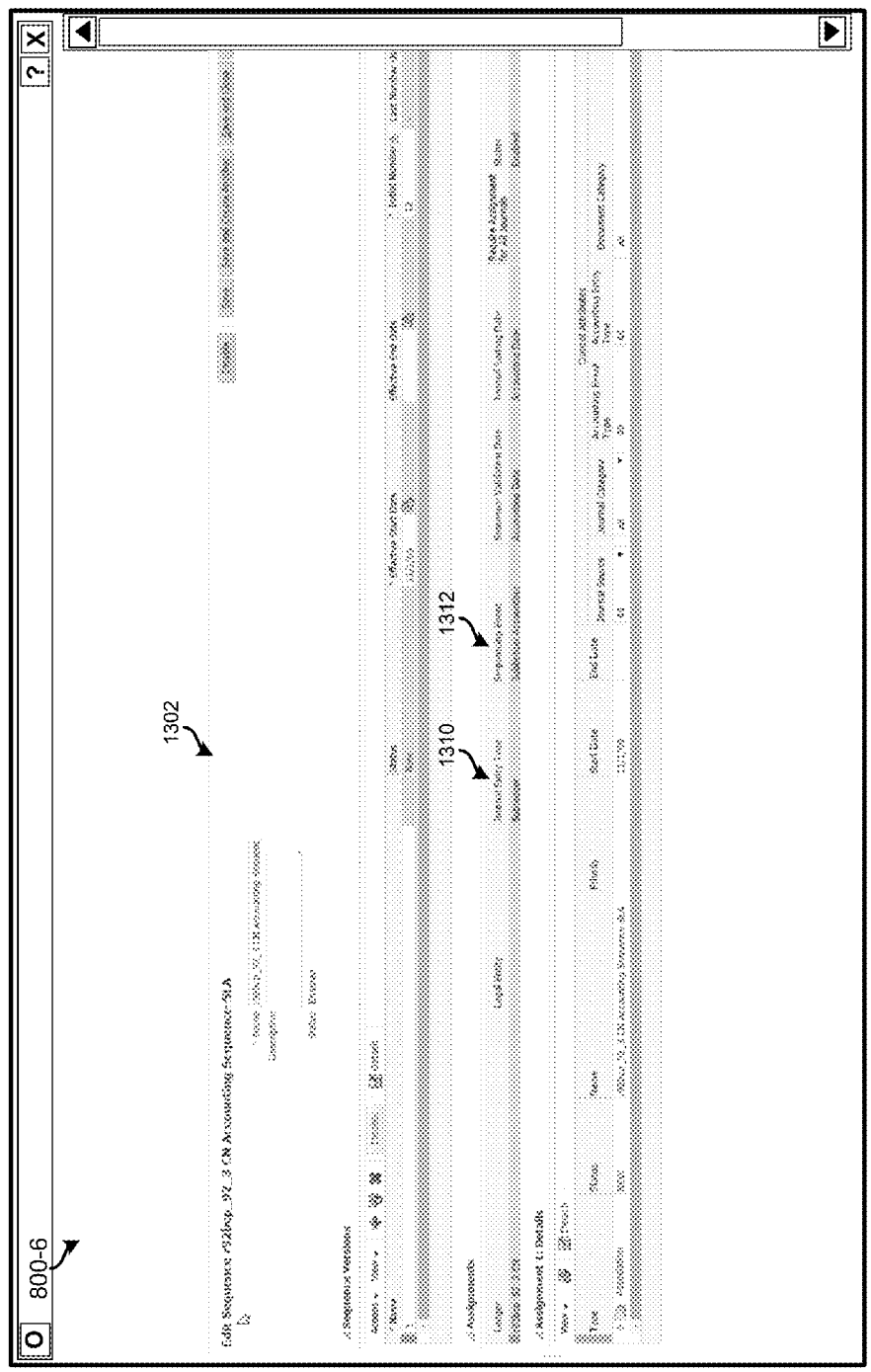
FIG. 13A shows an example view of an interface to allow for presentation and editing of aspects of accounting sequences for a subledger journal, in accordance with certain embodiments of the present disclosure.
Figure 13B:
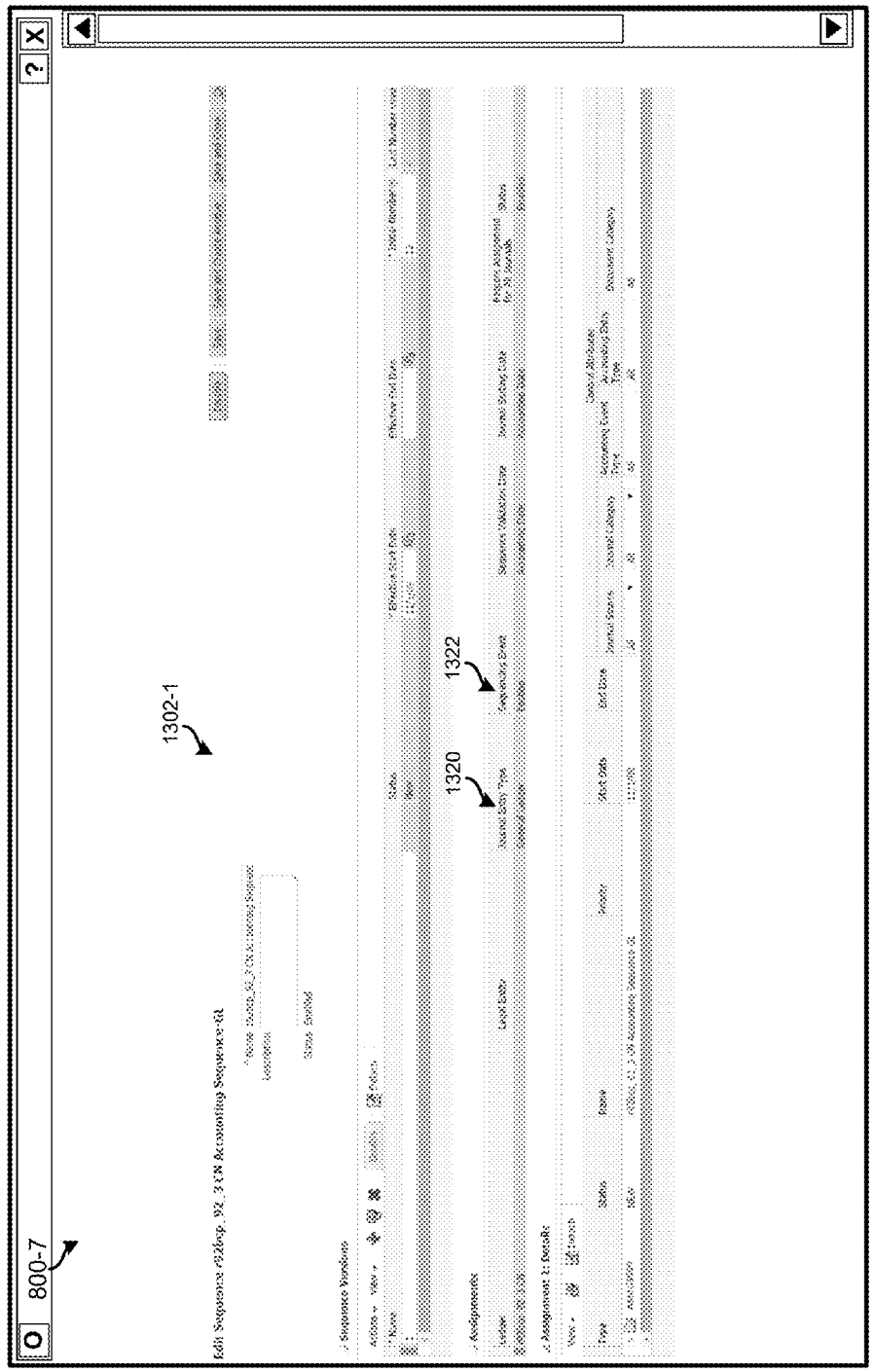
FIG. 13B shows an example view of an interface to allow for presentation and editing of aspects of accounting sequences for a general ledger journal, in accordance with certain embodiments of the present disclosure.

FIG. 12 shows an example of a rapid implementation request log extract 1202 for sequencing rules configuration and enforcement for journal sequences 1274, including subledger journals and general ledger journals, in accordance with certain embodiments of the present disclosure. In the depicted example, subledger journals are referenced by "SLA," (as indicated with 1275) and general ledger journals are referenced by "GL" (as indicated with 1276). FIG. 13A shows an example view 1302 of an interface 800-6 to allow for presentation and editing of aspects of accounting sequences for a subledger journal, in accordance with certain embodiments of the present disclosure. FIG. 13B shows an example view 1302-1 of an interface 800-7 to allow for presentation and editing of aspects of accounting sequences for a general ledger journal, in accordance with certain embodiments of the present disclosure. Though not shown, a similar interface may allow for presentation and editing of aspects of reporting sequences for subledger and general ledger journals.

An accounting sequence (e.g., indicated with 1278, 1279) may be a type of journal sequence that provides for sequencing triggered at or otherwise based on the time of accounting and/or posting. Accounting sequences may be created if the ledger option, enforce document sequence date correlation option 812 (e.g., FIG. 8) is disabled (i.e., set to "no", which may be the general default). An accounting sequence may include a journal entry type of subledger (1310) with a sequencing event of subledger accounting (1312) and/or a journal entry type of general ledger (1320) with a sequencing event of posting (1322). In some embodiments, accounting sequencing may be by ledger or legal entity.

A reporting sequence (e.g., indicated with 1275, 1276) may be a type of journal sequence that provides for delayed sequencing of complete journal batches triggered at or otherwise based on the time of period close. Reporting sequences may be created if the ledger option, enforce document sequence date correlation option 812 is enabled (i.e., set to "yes"). Italy requires gapless plus chronological sequences. So for Italy, the rapid implementation process can enable this option, and, thus, the general default is overridden by country-specific rules. A reporting sequence may include a journal entry type of subledger with a sequencing event of period close and/or a journal entry type of general ledger with a sequencing event of period close. In some embodiments, reporting sequencing may be by ledger or legal entity.

In the foregoing description, for the purposes of illustration, processes were described in a particular order. It should be appreciated that in alternate embodiments, the processes may be performed in a different order than that described. It should also be appreciated that the processes described above may be performed by hardware components or may be embodied in sequences of machine-executable instructions, which may be used to cause a machine, such as a general-purpose or special-purpose processor or logic circuits programmed with the instructions to perform the processes. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Furthermore, in the foregoing description, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of accelerating system documentation conformance to differentiated regulations of multiple countries, the method comprising:
    prepopulating, by a computer system, one or more tables in a relational database system with documentation specifications specifying documentation attributes corresponding to a plurality of transaction types and a plurality of countries;
    processing, by the computer system, information indicative of an enterprise structure, the information indicating at least:
        a first set of attributes corresponding to a set of one or more legal entities; and
        a second set of attributes corresponding to a set of one or more ledgers;
    based at least in part on the information indicative of the enterprise structure, identifying, by the computer system, one or more countries of the plurality of countries that correspond to the enterprise structure;
    determining, by the computer system, country-specific rules corresponding to the one or more countries, the country-specific rules defining requirements pertaining to documentation of transactions;
    selecting, by the computer system, a first subset of documentation attributes of the document attributes based at least in part on the country-specific rules, the first subset of documentation attributes specifying one or more documentation options pertaining to at least a first transaction type;
    selecting, by the computer system, a second subset of documentation attributes of the document attributes based at least in part on the country-specific rules, the second subset of documentation attributes specifying one or more documentation options pertaining to at least a second transaction type of the plurality of transaction types;
    based at least in part on the first subset of documentation attributes, the second subset of documentation attributes, and the information indicative of the enterprise structure, generating, by the computer system, a set of objects to facilitate setup of an accounting program, the set of objects comprising:
        a first subset of one or more objects corresponding to the set of one or more legal entities;
        a second subset of one or more objects corresponding to the set of one or more ledgers; and
        a third subset of one or more objects corresponding to an accounting calendar;
    populating, by an acceleration engine, the set of objects with specifications of sequencing options;
    storing, by the acceleration engine, the set of objects in association with the accounting program, and configuring the accounting program in accordance with the specifications of sequencing options to:
        generate a first series of transaction records of the first transaction type so that each transaction of the first series of transaction records is associated with the first subset of documentation attributes, the generating the first series of transaction records comprising creating a first sequence of the first series of transaction records in accordance with a first set of sequence attributes; and
        generate a second series of transaction records of the second transaction type so that each transaction of the second series of transaction records is associated with the second subset of documentation attributes, the generating the second series of transaction records comprising creating a second sequence of the second series of transaction records in accordance with a second set of sequence attributes.

2. The method of accelerating system documentation conformance to differentiated regulations of multiple countries of claim 1, wherein the documentation attributes comprise a set of attributes pertaining to sequencing requirements.

3. The method of accelerating system documentation conformance to differentiated regulations of multiple countries of claim 2, further comprising:
    processing, by the computer system, an indication of one or more user selections of one or more sequencing options;
    wherein the generating the set of objects to facilitate setup of the accounting program is further based in part on the indication of the one or more user selections of one or more sequencing options.

4. The method of accelerating system documentation conformance to differentiated regulations of multiple countries of claim 3, further comprising:
    receiving, by the computer system, an initialization document via a user interface; and
    deriving, by the computer system, the information indicative of the enterprise structure and the indication of the one or more user selections of the one or more sequencing options from the initialization document.

5. The method of accelerating system documentation conformance to differentiated regulations of multiple countries of claim 3, wherein the one or more sequencing options comprise an initial sequence value, a frequency of sequence restart, and a sequence restart value.

6. The method of accelerating system documentation conformance to differentiated regulations of multiple countries of claim 1, wherein the generating the set of objects to facilitate setup of the accounting program comprises:
populating one or more of the set of objects with metadata pertaining to the first subset of documentation attributes and the second subset of documentation attributes.

7. One or more non-transitory, machine-readable media having machine-readable instructions thereon for accelerating system documentation conformance to differentiated regulations of multiple countries, which instructions, when executed by one or more processing devices, cause the one or more processing devices to:
prepopulate one or more tables in a relational database system with documentation specifications specifying documentation attributes corresponding to a plurality of transaction types and a plurality of countries;
process information indicative of an enterprise structure, the information indicating at least:
a first set of attributes corresponding to a set of one or more legal entities; and
a second set of attributes corresponding to a set of one or more ledgers;
based at least in part on the information indicative of the enterprise structure, identify one or more countries of the plurality of countries that correspond to the enterprise structure;
determine country-specific rules corresponding to the one or more countries, the country-specific rules defining requirements pertaining to documentation of transactions;
select a first subset of documentation attributes of the document attributes based at least in part on the country-specific rules, the first subset of documentation attributes specifying one or more documentation options pertaining to at least a first transaction type;
select a second subset of documentation attributes of the document attributes based at least in part on the country-specific rules, the second subset of documentation attributes specifying one or more documentation options pertaining to at least a second transaction type of the plurality of transaction types;
based at least in part on the first subset of documentation attributes, the second subset of documentation attributes, and the information indicative of the enterprise structure, generate a set of objects to facilitate setup of an accounting program, the set of objects comprising:
a first subset of one or more objects corresponding to the set of one or more legal entities;
a second subset of one or more objects corresponding to the set of one or more ledgers; and
a third subset of one or more objects corresponding to an accounting calendar;
populate the set of objects with specifications of sequencing options;
store the set of objects in association with the accounting program, and configure the accounting program in accordance with the specifications of sequencing options to:
generate a first series of transaction records of the first transaction type so that each transaction of the first series of transaction records is associated with the first subset of documentation attributes, the generating the first series of transaction records comprising creating a first sequence of the first series of transaction records in accordance with a first set of sequence attributes; and
generate a second series of transaction records of the second transaction type so that each transaction of the second series of transaction records is associated with the second subset of documentation attributes, the generating the second series of transaction records comprising creating a second sequence of the second series of transaction records in accordance with a second set of sequence attributes.

8. The one or more non-transitory, machine-readable media of claim 7, wherein the documentation attributes comprise a set of attributes pertaining to sequencing requirements.

9. The one or more non-transitory, machine-readable media of claim 8, wherein the instructions further cause the one or more processing devices to:
process an indication of one or more user selections of one or more sequencing options;
wherein the generating the set of objects to facilitate setup of the accounting program is further based in part on the indication of the one or more user selections of one or more sequencing options.

10. The one or more non-transitory, machine-readable media of claim 9, wherein the instructions further cause the one or more processing devices to:
receive an initialization document via a user interface; and
derive the information indicative of the enterprise structure and the indication of the one or more user selections of the one or more sequencing options from the initialization document.

11. The one or more non-transitory, machine-readable media of claim 9, wherein the one or more sequencing options comprise an initial sequence value, a frequency of sequence restart, and a sequence restart value.

12. The one or more non-transitory, machine-readable media of claim 7, wherein the generating the set of objects to facilitate setup of the accounting program comprises:
populating one or more of the set of objects with metadata pertaining to the first subset of documentation attributes and the second subset of documentation attributes.

13. The one or more non-transitory, machine-readable media of claim 8, wherein the sequencing requirements comprise one or more of a requirement to sequence by ledger, a requirement to sequence by legal entity, a gapless sequencing requirement, a requirement for chronological ordering based on document date, a requirement for sequencing based at least in part on a time of period close, a requirement for sequencing based at least in part on a time of accounting, and/or a requirement for sequencing based at least in part on a time of posting.

14. One or more non-transitory, machine-readable media having machine-readable instructions thereon for accelerating system documentation conformance to differentiated regulations of multiple countries, which instructions, when executed by one or more processing devices, cause the one or more processing devices to:
process information indicative of an enterprise structure, the information indicating at least:
a first set of attributes corresponding to a set of one or more legal entities; and a second set of attributes corresponding to a set of one or more ledgers;

based at least in part on the information indicative of the enterprise structure, identify one or more countries of a plurality of countries that correspond to the enterprise structure;

determine country-specific rules corresponding to the one or more countries, the country-specific rules defining requirements pertaining to documentation of transactions;

select a first subset of documentation attributes from document attributes based at least in part on the country-specific rules, wherein the documentation attributes correspond to a plurality of transaction types and the plurality of countries and are specified by documentation specifications stored in one or more prepopulated tables in a relational database system, and wherein the first subset of documentation attributes specify one or more documentation options pertaining to at least a first transaction type of the plurality of transaction types;

select a second subset of documentation attributes from the document attributes based at least in part on the country-specific rules, the second subset of documentation attributes specifying one or more documentation options pertaining to at least a second transaction type of the plurality of transaction types; and populate a set of objects with specifications of sequencing options;

store the set of objects in association with an accounting program, and configure the accounting program in accordance with the specifications of sequencing options, the set of objects comprising:
 a first subset of one or more objects corresponding to the set of one or more legal entities;
 a second subset of one or more objects corresponding to the set of one or more ledgers; and
 a third subset of one or more objects corresponding to an accounting calendar;
 wherein the set of objects is based at least in part on the first subset of documentation attributes, the second subset of documentation attributes, and the information indicative of the enterprise structure;

in accordance with the specifications of the sequencing options, the accounting program:
 generating, based at least in part on the set of objects, a first series of transaction records of a first transaction type so that each transaction of the first series of transaction records is associated with the first subset of documentation attributes, the generating the first series of transaction records comprising creating a first sequence of the first series of transaction records in accordance with a first set of sequence attributes; and
 generating, based at least in part on the set of objects, a second series of transaction records of a second transaction type so that each transaction of the second series of transaction records is associated with the second subset of documentation attributes, the generating the second series of transaction records comprising creating a second sequence of the second series of transaction records in accordance with a second set of sequence attributes.

15. The one or more non-transitory, machine-readable media of claim 14, wherein the documentation attributes comprise a set of attributes pertaining to sequencing requirements.

16. The one or more non-transitory, machine-readable media of claim 15, wherein the instructions further cause the one or more processing devices to:
 process an indication of one or more user selections of one or more sequencing options; and
 generate the set of objects to facilitate setup of the accounting program based in part on the indication of the one or more user selections of one or more sequencing options.

17. The one or more non-transitory, machine-readable media of claim 16, wherein the instructions further cause the one or more processing devices to:
 receive an initialization document via a user interface; and
 derive the information indicative of the enterprise structure and the indication of the one or more user selections of the one or more sequencing options from the initialization document.

18. The one or more non-transitory, machine-readable media of claim 15, wherein the one or more sequencing options comprise an initial sequence value, a frequency of sequence restart, and a sequence restart value.

19. The one or more non-transitory, machine-readable media of claim 16, wherein the generating the set of objects to facilitate setup of the accounting program comprises:
 populating one or more of the set of objects with metadata pertaining to the first subset of documentation attributes and the second subset of documentation attributes.

20. The method of accelerating system documentation conformance to differentiated regulations of multiple countries of claim 1, the method further comprising:
 invoking, by one or more servers of the computer system, an application program interface to execute initialization procedures in modules of the accounting program;
 facilitating, by the one or more servers, a user interface to accept specifications of one or more user selections of one or more sequencing options;
 receiving, by the one or more servers, an indication of one or more user selections of one or more sequencing options;
 deriving, by the one or more servers, the information indicative of the enterprise structure and the specifications of sequencing options based at least in part on an initialization document;
 the prepopulating the one or more tables in the relational database system with the documentation specifications based at least in part on the indication of the one or more user selections of the one or more sequencing options, wherein:
  the documentation attributes comprise a set of attributes pertaining to sequencing requirements;
  the sequencing requirements comprise one or more of a requirement to sequence by ledger, a requirement to sequence by legal entity, a gapless sequencing requirement, a requirement for chronological ordering based on document date, a requirement for sequencing based at least in part on a time of period close, a requirement for sequencing based at least in part on a time of accounting, and/or a requirement for sequencing based at least in part on a time of posting; and
  the one or more sequencing options comprise an initial sequence value, a frequency of sequence restart, and a sequence restart value;
 wherein the generating the set of objects to facilitate setup of the accounting program:

is further based in part on the indication of the one or more user selections of one or more sequencing options; and comprises populating one or more of the set of objects with metadata pertaining to the first subset of documentation attributes and the second subset of documentation attributes; and wherein:
  the first subset of documentation attributes and the second subset of documentation attributes comprise the specifications of sequencing options,
  the first subset of documentation attributes corresponds to the first set of sequence attributes; and
  the second subset of documentation attributes corresponds to the second set of sequence attributes.

* * * * *